United States Patent [19]

Gammon

[11] Patent Number: 5,781,865
[45] Date of Patent: Jul. 14, 1998

[54] PCS CELL SITE SYSTEM FOR ALLOWING A PLURALITY OF PCS PROVIDERS TO SHARE CELL SITE ANTENNAS

[75] Inventor: R. Keith Gammon, Kennesaw, Ga.

[73] Assignee: Scientific Research Corporation, Atlanta, Ga.

[21] Appl. No.: 650,618

[22] Filed: May 20, 1996

[51] Int. Cl.⁶ .................................................. H04B 1/38
[52] U.S. Cl. .................. 455/561; 455/103; 455/132; 333/132; 370/343; 370/488
[58] Field of Search .................. 455/103, 102, 455/132, 140, 82, 272, 273, 115, 443, 561, 562; 370/343, 344, 480, 488; 333/132, 101, 129

[56] References Cited

U.S. PATENT DOCUMENTS

| 4,646,295 | 2/1987 | Basile | 370/488 |
| 5,386,203 | 1/1995 | Ishihara | 333/129 |
| 5,590,415 | 12/1996 | Peltola et al. | 455/115 |

Primary Examiner—Reinhard J. Eisenzopf
Assistant Examiner—Lee Nguyen
Attorney, Agent, or Firm—Troutman Sanders LLP; Scott M. Frank

[57] ABSTRACT

A new system for allowing PCS Providers to share cell sites, and more particularly multi-sector antennas, is provided. The present invention utilizes primarily passive, linear components to combine the transmit signals of PCS Providers which reside in non-adjacent frequency bands over a multi-sector antenna and to distribute from a multi-sector antenna the receive signals in all frequency bands of the PCS Providers.

8 Claims, 21 Drawing Sheets

PCS CELL SITE SYSTEM FOR ALLOWING A PLURALITY OF PCS PROVIDERS TO SHARE CELL SITE ANTENNAS

BACKGROUND OF THE INVENTION

1. Technical Field

As a result of the growing number of providers of Personal Communication Services (PCS) coupled with the limited availability of prime real estate for new cell sites, an economically favorable option for PCS Providers is to share cell sites. The present invention allows multiple PCS providers to share cell sites, and, more particularly, cell site antennas.

2. Description of the Prior Art

As shown in FIG. 1, in prior art cellular systems, PCS Providers are able to transmit and receive signals among all users within a particular geographic area by ensuring that all of its users are within one of the cells 105 which surround each cell site 120. Accordingly, as shown in FIG. 1, the cell sites 120 are systematically interspersed throughout a geographic area so that the cells 105 overlap just enough to allow a PCS provider to provide transmission and reception capabilities to its users throughout the entire geographic area. The cell sites 120 act as an interface between the users of the PCS network and those outside the network using the public telephone system.

FIG. 2 shows how a multi-sector antenna 200 is used to provide the 360 degree horizontal coverage of the cell 105. A multi-sector antenna 200 typically uses three 120 degree sector antennas 201 to obtain up to a full 360 degree horizontal coverage. However, a multi-sector antenna 200 could use two sector antennas 201, four sector antennas 201, or any number (n) individual sector antennas 201. FIG. 3 provides a simplified representation of the multi-sector antenna 200 of FIG. 2, where the multi-sector antenna 200 may have any number (n) of these individual sector antennas.

FIG. 4 shows the separate frequency bands currently allocated by the FCC for use by PCS Providers in the United States. In any one geographic area, six separate companies, or Providers, may hold a license to operate a PCS system on one of these frequency bands. With this arrangement, the Provider holding the license for Band A would be allowed to transmit signals from their cell site on the frequency band between 1930 MHz and 1945 MHz and receive signals at their cell site on the frequency band between 1850 MHz and 1865 MHz. Likewise, the Provider holding the license for Band B could transmit from their cell site on the frequency band between 1950 MHz and 1965 MHz and receive signals at their cell site on the frequency band between 1870 MHz and 1885 MHz. As is shown in FIG. 4, the Providers holding the license for Band C, D, E and F may also use their respective frequency bands to transmit and receive signals.

FIGS. 5 and 6A illustrate two prior art cell site 120 architectures which allow a PCS Provider to provide its service. FIG. 5 shows a cell site 120 comprised of a transmitter system 500 and a separate receiver system 510 for transmitting and receiving signals, respectively, from and to the cell site. Here, the transmitter system 500 is comprised of a transmit multi-sector antenna 200T and transmitter equipment 505, including a high power amplifier 501 and a transmitter 502. The receiver system 510 is comprised of a receive multi-sector antenna 200R and receiver equipment 515, including a receiver 512 and a low noise amplifier (LNA) 511. In operation, the PCS provider transmits all signals over the transmitter system 500 and receives all signals over the receiver system 510.

FIG. 6A illustrates an alternative prior art cell site 120 architecture, which incorporates a diplexer 604 to allow a PCS Provider to transmit and receive from the same multi-sector antenna 200T/R (a transmit/receive multi-sector antenna). This prior art embodiment allows the PCS Provider to receive the same signal from multiple paths via two spatially diverse antennas in order to, among other reasons, minimize multipath distortion, increase the sensitivity of the system, and increase the level of the desired signal. This cell site 120 architecture is similar to the embodiment of FIG. 5 in that the transmit system is comprised of multi-sector antenna 200T/R, the addition of a diplexer 604, and transmitter equipment 505, including a high power amplifier 501 and a transmitter 502. Further, the receiver system includes a primary receive path identical to that of FIG. 5, which is comprised of a receive multi-sector antenna 200R and receiver equipment 615, including a receiver 512 and an LNA 511. However, the receiver system also includes a second receive path comprised of the transmit/receive multi-sector antenna 200T/R, the diplexer 604, and a second receiver 612 and LNA 611 included in the receiver equipment 615.

As shown in FIG. 6B, the diplexer 604 is a three port device which is capable of providing communication paths for one transmit path and one receive path only using a transmit bandpass filter 651 and a receive bandpass filter 652. The diplexer 604 provides Radio Frequency (RF) isolation between the transmit and receive ports while maintaining a low power loss path for the transmit signals to the common antenna port and for the receive signals from the common antenna port.

The above-described prior art systems are sufficient for PCS Providers who have adequate access to cell sites (towers) which allow the PCS Provider to provide cells throughout an entire geographic region as shown in FIG. 1. However, acquiring access to the real estate for these cell sites (towers) and building the towers, where needed, throughout a geographic region is extremely expensive. Moreover, citizens of many geographic regions have begun to make it known that they would like to eliminate as many cell sites (towers) as possible because they are extremely tall and somewhat unsightly.

For that reason, some PCS Providers have considered sharing cell sites (towers). An obvious method for these PCS Providers to share the cell sites would be to have each install its own multi-sector antenna system. FIG. 7 illustrates six PCS Providers for bands A, B, C, D, E and F sharing a cell site using the cell site architecture of FIG. 5., and FIG. 8 illustrates the same six PCS Providers sharing a cell site and using the cell site architecture of FIG. 6A.

A major drawback associated with sharing cell sites according to the embodiments of FIGS. 7 and 8 is that the cell sites would need extremely tall towers and the towers may have difficulty supporting the additional multi-sector antennas 200. The reason for the difficulty is that the multi-sector antennas extend from the tower and tend to create torques of immense force, as a result of wind, storms and other environmental considerations. Accordingly, many such towers are limited to the number of multi-sector antennas they may support or PCS Providers are forced to spend large sums of money to enhance the supportability and height of the tower.

To overcome the problems associated with having numerous multi-sector antennas on a tower, some in the PCS field may have considered sharing cell sites among PCS Providers by undertaking to develop a system to share multi-sector antennas. However, it is believed that no one in the PCS field has developed such a system because those of ordinary skill in the art believe that any such system would be extremely difficult and/or expensive to implement. More specifically, it is believed that those in the PCS field are of the common belief that any such system would be essentially a non-viable alternative to the prior art systems of FIGS. 7 and 8 because of their high cost, complexity and unreliability.

For example, one method of sharing multi-sector antennas that would not likely be considered as a viable alternative is the use of radio frequency (RF) combiners and splitters to share transmit and receive antennas, respectively. As shown in FIG. 9A, a combiner system 900 typically includes an RF combiner 951 and a high power linear amplifier 952. As shown in FIG. 9B, a splitter system 910 typically includes an RF splitter 953 and a low noise amplifier 954. FIG. 10A illustrates the application of an RF combiner system 900 and splitter system 910 to the cell site 120 architecture FIGS. 5 and 7, and FIG. 10B illustrates the application of a combiner system 900 and splitter system 910 to the cell site 120 architecture of FIGS. 6A and 8.

For the prior art system of FIG. 10A, PCS Providers could share a transmit antenna 200T and a receive antenna 200R. Likewise, for the prior art system of FIG. 10B, PCS Providers could share a transmit/receive antenna 200T/R and a receive antenna 200R. However, it is believed that this alternative has never been pursued because it has a substantial shortcoming in regards to the significant power loss which would be incurred in the RF combiner 951 component of the RF combiner system 900. Referring to FIG. 9A, a majority of the power input from each PCS Provider transmit equipment to the RF combiner 951 would be dissipated internally within the RF combiner instead of being transferred to the output port. To compensate for this loss, the combiner system 900 must either include a high power linear amplifier 952 as shown, or each PCS Provider must increase their transmit output accordingly. In either case, providing an amplifier with sufficiently high power or increasing a PCS Provider's transmit output sufficiently would be extremely expensive. Another drawback of using active amplification to compensate for the power loss is the resulting intermodulation distortion which would occur as a result of amplifier non-linearities.

Another example method of sharing multi-sectors antennas that would not likely be considered a viable alternative by those of ordinary skill in the field, is the typical application of multiplexers to share transmit and receive antennas. As shown in FIG. 11, a transmit multiplexer 1100 typically includes multiple bandpass filters 1101 tied to a common antenna port. The transmit bandpass filters 1101 would correspond to the cell site transmit bands illustrated in FIG. 4. Similarly, as shown in FIG. 11, a receive multiplexer 1105 typically includes multiple bandpass filters 1102 tied to a common antenna port. The receive bandpass filters 1102 would correspond to the cell cite receive bands illustrated in FIG. 4. The transmit multiplexer 1100 and a receive multiplexer 1105 and requisite amplifiers 952 and 954 could then be used in place of the RF combiner system 900 and RF splitter system 910, respectively, in the cell site illustration of FIGS. 10A and 10B.

The advantage of the multiplexers 1100 and 1105 relative to a combiner 900 and splitter 910 is that they typically exhibit a smaller power loss between each input and the common antenna port. FIG. 12 shows the six bandpass response curves for the typical implementation of a transmit multiplexer 1100. The transmit signal from the Band A Provider would be filtered as shown by response curve 1210, the transmit signal from the Band D Provider would be filtered as shown by response curve 1220, the transmit signal from the Band B Provider would be filtered as shown by response curve 1230, the transmit signal from the Band E Provider would be filtered as shown by response curve 1240, the transmit signal from the Band F Provider would be filtered as shown by response curve 1250, and the transmit signal from the Band C Provider would be filtered as shown by response curve 1260.

The shortcoming of the multiplexers 1100 and 1105 when used in this typical fashion is that due to the contiguous nature of the individual PCS transmit bands currently licensed by the FCC, the passband regions overlap for certain filters. For example, the transmit passband for the PCS Band D Provider 1220 is overlapped by the passband response of the Band A Provider 1210 and the Band B Provider 1230. In these overlap regions, the power loss for a transmitted signal would increase significantly, thereby negating the benefits of the multiplexer. Due to the contiguous nature of the PCS receive frequency bands currently licensed by the FCC, as shown in FIG. 4, the receive multiplexer 1105 would also experience the same power loss in these overlapping regions. As a result, expensive and active amplification, which would include a high power amplifier 952 for the transmit multiplexer 1100 and a low noise amplifier 954 for the receive multiplexer 1105, would again be required to compensate for these losses.

Accordingly, a need exists for a system which allows PCS Providers to more economically, more reliably and more simply share cell sites. The above-described shortcomings, and other shortcomings of the prior art techniques for allowing PCS Providers to share cell sites are effectively overcome by the present invention, as described in further detail below.

SUMMARY OF THE INVENTION

In accordance with the teachings of the present invention, a new system for allowing CS Providers to share cell sites, and more particularly multi-sector antennas, is provided. The present invention provides a system which is much more economical, reliable and easier to install and use than those of ordinary skill in the PCS industry previously thought possible. The present invention utilizes primarily passive, linear components to combine the transmit signals of PCS Providers which reside in non-adjacent frequency bands over a multi-sector antenna and to distribute from a multi-sector antenna the receive signals in all frequency bands of the PCS Providers.

The primary advantage of the present invention over the prior art embodiments in FIGS. 7 and 8 is that PCS Providers may share multi-sector antennas, rather than each having to add its own multi-sector antennas to the cell site (tower), thereby reducing the stress impacted on the cell site towers and potentially reducing the height of the tower. Further, the primary advantage of the present invention over systems that might use the RF combiner/splitters of FIGS. 9 and 10 and the multiplexers of FIGS. 11 and 12 is that no expensive high power amplifiers are necessary because the power loss in the system of the present invention is negligible. In addition, because the present invention utilizes primarily passive linear components, it is both comparatively inexpensive, highly reliable, and free of significant intermodulation distortion as compared to those systems requiring active high power amplification.

The transmitter network 1300, as shown in FIG. 13, preferably includes: a plurality of bandpass filters for filtering signals of a plurality of non-adjacent PCS frequency bands; a plurality of input lines coupled to the bandpass filters, where the input lines are connectable to the transmission equipment of a plurality of PCS Providers; and an output line coupled to the bandpass filters, where the output line is connectable to a transmit antenna. The bandpass filters are capable of filtering signals in the PCS transmit frequency bands of FIG. 4 and any other frequency bands that are made available to PCS Providers.

The receiver network 1400, as shown in FIG. 14, preferably includes: a single bandpass filter for passing the entire PCS cell site receive frequency band; an amplifier coupled to the bandpass filter; a splitter coupled to the amplifier; an input line coupled to the bandpass filters, where the input line is connectable to a receive antenna; and a plurality of output lines coupled to the splitter, where the output lines are connectable to receiver equipment of a plurality of PCS Providers. The bandpass filter is capable of filtering signals in the PCS receive frequency band of 1850 MHz to 1910 MHz as shown in FIG. 4 and any other frequency bands that are made available to PCS Providers.

The transceiver network 1500, as shown in FIG. 15, preferably combines the transmitter network 1300 and receiver network 1400. More specifically, for the transceiver network 1500, all of the components of the transmitter network 1300 and receiver network 1400 remain the same except that the output lines 1330 of the transmitter network 1300 and the input lines 1420 of the receiver network 1400 are preferably replaced with input/output lines 1510, which may be connected to a transmit/receive antenna.

In operation, each PCS Provider may transmit signals over the shared transmit antenna by transmitting their signals from their transmitter equipment via input line to the bandpass filter provided for the PCS Provider's frequency band. The bandpass filter then forwards the signal via the output line to the transmit antenna for transmission. Each PCS Provider may also receive signals over the shared receive antenna according to the following operations. Each PCS Provider's signal is received by the receive antenna and forwarded via the input line to the bandpass filter. Next, the bandpass filter forwards it to an amplifier for amplifying and the signal is then distributed to the PCS Provider's receiver equipment from a splitter via an output line.

In another aspect of the present invention, the transmitter and receiver networks may be utilized with the standard transmitter/receiver PCS configuration of FIG. 7 and the diplexer configuration of FIG. 8. Further, the present invention includes built-in-test monitoring to detect failures and sense impending problems with the system. Moreover, the present invention provides high power handling capabilities, low insertion loss, non-specific modulation capabilities, high Q filters with steep roll-off characteristics, flat passband gain, flat passband group delay and connectorized components for easy installation and maintenance. The aforementioned and other aspects of the present are described in the detailed description and attached illustrations which follow.

As described above in the Background of the Invention, it is believed that those in the PCS field have never seriously considered attempting to develop a PCS cell site system where multiple PCS Providers could share an antenna. Further, it is believed that, if those of ordinary skill in the PCS field considered sharing antennas among multiple PCS Providers, they would initially seek to employ the use of RF combiners and RF splitters. It is believed that this technique would be abandoned due to the expense and resulting intermodulation distortion of the high power amplifiers required to compensate for the combiner 900 and splitter 910 power losses.

Further, it is believed that those of ordinary skill in the PCS field who abandon the technique of using combiners/splitters would not likely conceive of using multiplexers at all to share antennas among multiple PCS Providers. More specifically, given the fact that high power losses would occur in the filter passband overlap regions, as described by FIG. 12, those of ordinary skill in the art would likely readily conclude that extremely expensive high power amplifiers are necessary. Accordingly, the expensive amplifiers would be deemed a non-viable alternative to simply adding antennas and additional support to cell site towers.

Furthermore, it is believed that those of ordinary skill in the PCS field have never considered attempting to develop a PCS cell site system using primarily passive components (e.g., no amplifiers) like that of the present invention because of the frequency band overlapping problem described above for FIG. 12. More specifically, because the PCS transmit frequency bands and receive frequency bands currently licensed by the FCC (See FIG. 4) are all respectively adjacent, those of ordinary skill in the art would have likely concluded that the use of primarily passive components in a PCS cell site system like that of the present invention was not a plausible solution to the above-described problem in the PCS field.

However, by utilizing separate antennas at a cell site (tower) for groups of non-adjacent frequency band PCS providers, as set forth for the present invention, all PCS Providers may utilize and share a cell site much more economically, easily and reliably than previously believed possible. For example, referring to FIG. 4, by utilizing the system of the present invention, PCS Providers A, B and F could share a first antenna and PCS Providers D, E and C could share a second antenna. Accordingly, two pairs of transmit and receive antennas or two transmit/receive antennas could be attached to a cell site tower, as compared to the six sets of antennas shown in the prior art.

By using primarily passive components, the reliability of the system of the present invention is much greater than a system which would require high power amplifiers such as the RF combiner and splitters of FIGS. 9 and 10 or multiplexers of FIGS. 11 and 12. Moreover, the cost to implement the same cell site is substantially less than the cost to implement a system employing the high power amplifiers which would be required for the combiner/splitter or multiplexer systems of FIGS. 9 through 12. Accordingly, for the above stated reasons and other reasons, the present invention is believed to be novel and non-obvious to one of ordinary skill in the art.

DETAILED DESCRIPTION OF THE INVENTION

The PCS cell site system of the present invention which allows PCS Providers to share cell sites preferably includes a transmitter network and a receiver network. The transmitter network allows two or more PCS Providers of non-adjacent frequency bands to transmit signals over a multi-sector antenna, and the receiver network allows two or more PCS Providers to receive signals over a multi-sector antenna.

Figure 13:
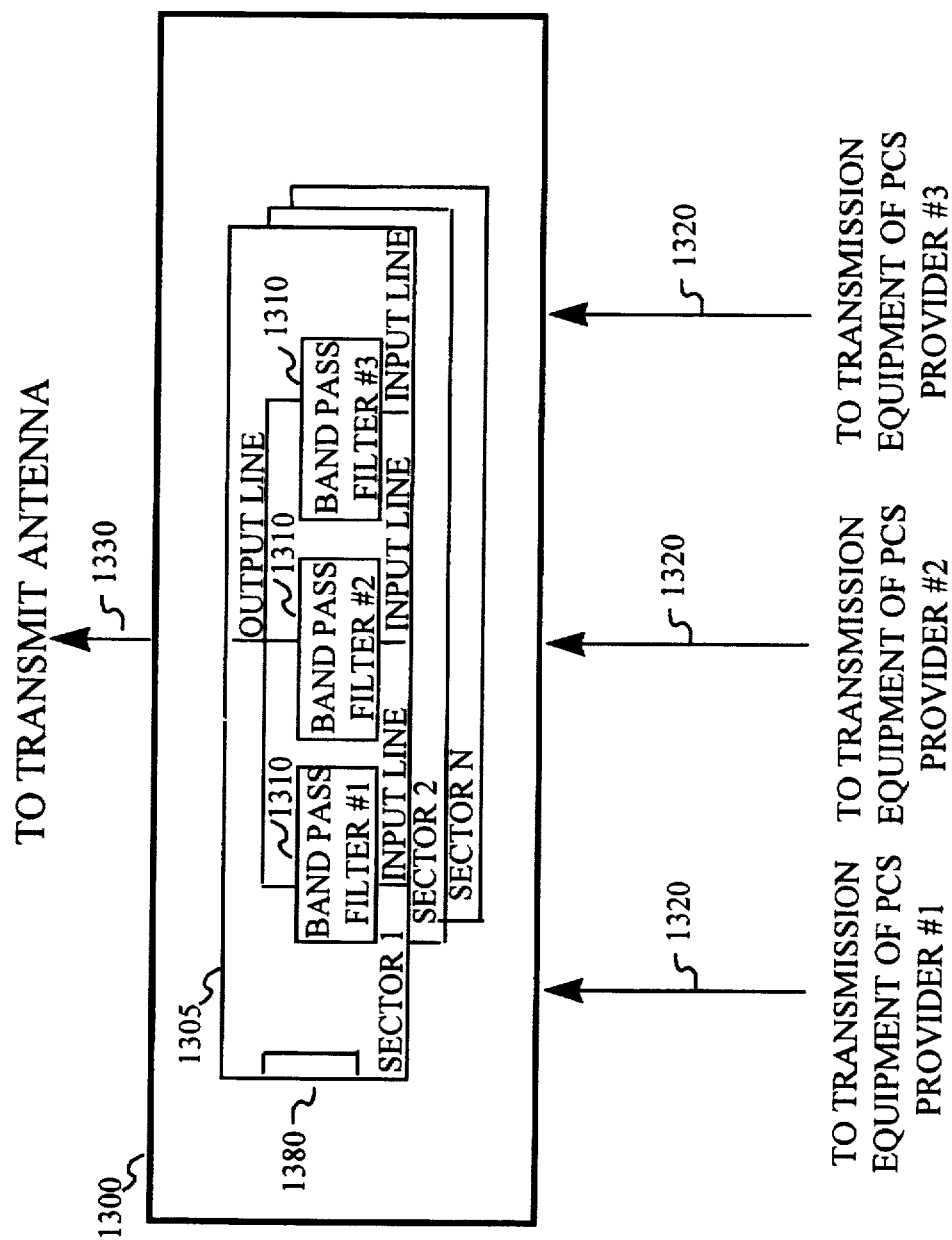
FIG. 13 depicts the transmitter network of the present invention.

As shown in FIG. 13, the transmitter network 1300 consists of a transmitter sector 1305 for each antenna sector. Each transmitter sector 1305 preferably includes: a plurality of bandpass filters 1310 for filtering signals of a plurality of non-adjacent PCS frequency bands, including the PCS transmit frequency bands shown in FIG. 4 and any other frequency bands that are made available to PCS Providers; a plurality of input lines 1320 coupled to the bandpass filters 1310, where each input line 1320 is connectable to the transmission equipment of a PCS Provider; and an output line 1330 coupled to the bandpass filters 1310, where the output line 1330 is connectable to a transmit antenna.

The transmitter network 1300 is preferably formed using cavity filter technology, though it may be formed using other filter technology, such as resistor/capacitor (RC) network technology. Cavity filter technology is preferred because it is relatively inexpensive, has a high power handling capability, and does not use active or other non-linear components which are susceptible to the creation of intermodulation distortion. The transmitter network 1300 includes bandpass filtering of particular PCS frequency bands and preferably includes the following characteristics for each transmission path: a maximum insertion loss of 1.0 dB over the passband, a maximum VSWR of 1.5:1 over the passband, a gain variation of less than 0.5 dB peak-to-peak over any 15 MHz segment within any passband, a group delay variation of less than 90 nsec. over any 15 MHz segment within the passband, an average power capacity of 200 Watts per input, a peak power capacity of 5000 Watts per input, steep filter roll-off characteristics, and a capability of handling all PCS modulation types (e.g., GSM, IS-95, etc.) FSY Microwave, Inc. of Columbia, Md. and Metropole of Stafford, Va. are manufacturers of bandpass cavity filter technology, who can manufacture such a transmitter network.

Of note, the transmitter network 1300 of the present invention may include amplifiers and other components to potentially enhance the performance of the present invention. However, the cost to include any such components in the present invention should be comparatively inexpensive compared to the multiplexers and multicouplers described above in the Background of the Invention. This follows because the present invention does not have the same overlapping and power loss problems as a result of the use of non-adjacent frequency bands.

The input lines 1320 and output line 1330 preferably include connectors, such as 7/16 DIN connectors. The connectors of the input lines 1320 allow for easy connection to the PCS Provider's transmission equipment, and the connector for the output line 1330 allows for easy connection to a transmit antenna 200T.

Figure 1:
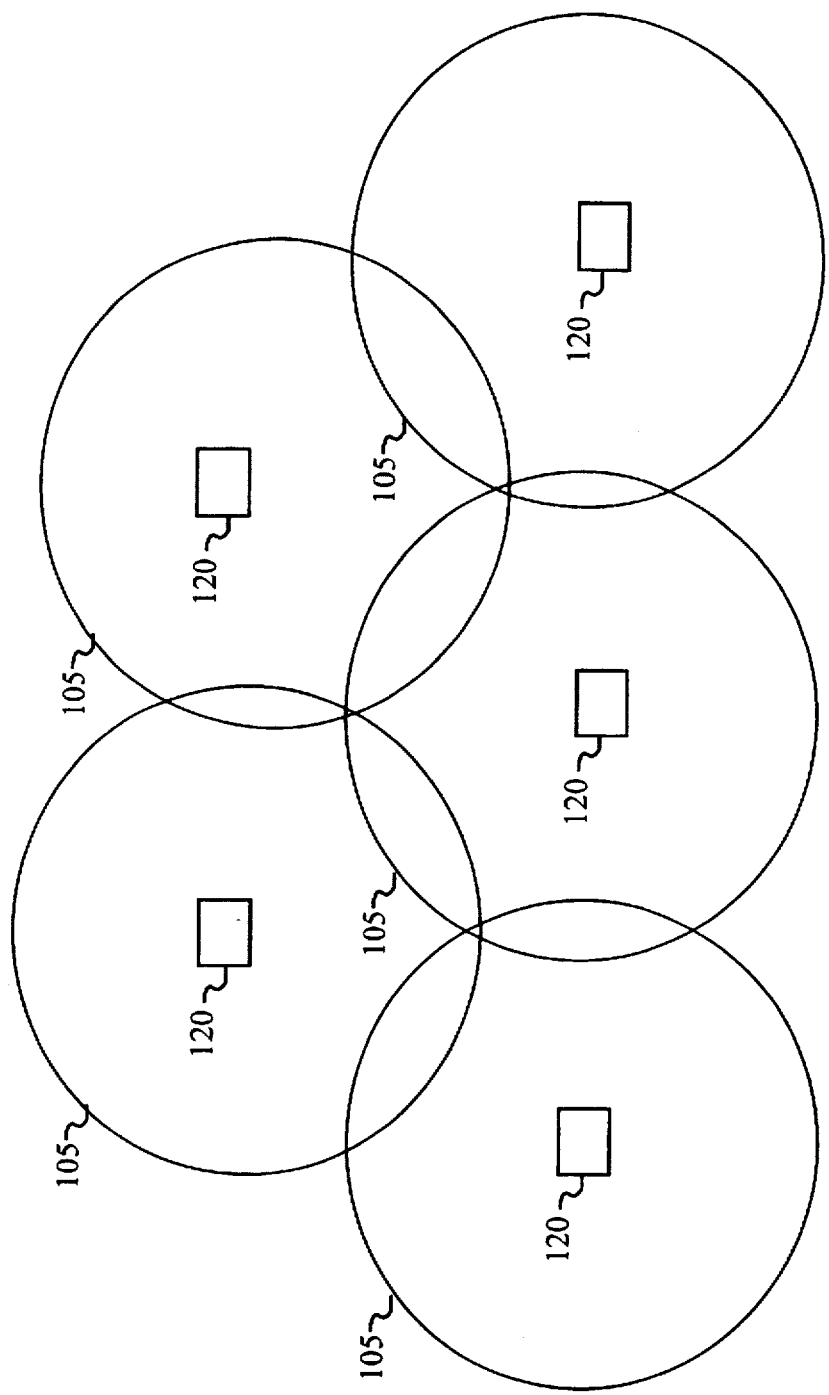
FIG. 1 depicts a diagram of a prior art cellular system.
Figure 2:
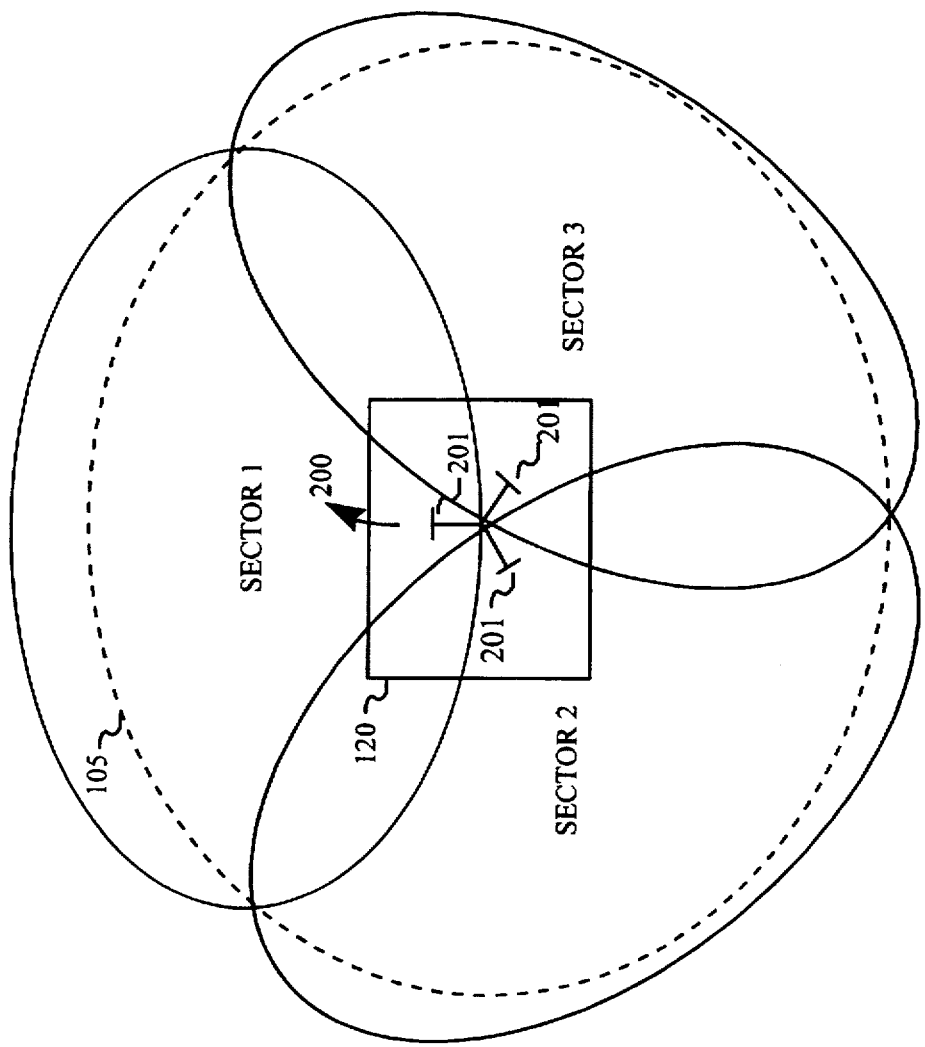
FIG. 2 depicts a block diagram of a multi-sector antenna.
Figure 3:
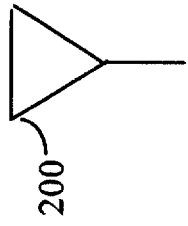
FIG. 3 depicts a simplified representation of the multi-sector antenna of FIG. 2.

In use, each input line 1320 of a transmitter sector 1305 is connected to the transmission equipment, including a transmitter, of PCS Providers that are operating in a frequency band which is not adjacent to the frequency band of other Providers using the same transmitter network 1300, and the output line 1330 is connected to a single transmit antenna 201 for the transmitter sector 1305. As described in the Background of the Invention for FIGS. 2 and 3, each transmit multi-sector antenna 200T is comprised of multiple transmit antennas 201 which cover a horizontal sector (e.g., 32 degrees, 65 degrees, 90 degrees, 105 degrees, 120 degrees, etc.). Therefore, if, for example, each transmit antenna 201 covers only 120 degrees, then three transmit antennas 201 could be used to form a transmit multi-sector antenna 200T covering 360 degrees. In this case, three sets of the transmitter sectors 1305 would be used where they could be packaged either separately or together.

The transmission equipment for each PCS Provider is then connected to the input line 1320 associated with the respective bandpass filter 1310 on each one of the three transmitter sectors 1305, and each output line 1330 for each transmitter sector 1305 is connected to a different 120 degree transmit antenna 201. Accordingly, each PCS Provider may transmit its signals over the same transmit multi-sector antenna 200T transmitting in all directions.

In operation, each PCS Provider transmits its signals from its transmission equipment to one of the input lines 1320. The input line 1320 used will be dependent on which transmit sector 1305 is connected to the desired transmit antenna 201 as well as which bandpass filter 1010 within the transmit sector 1305 corresponds to the Provider's transmit frequency band. The input line 1320 then forwards the signal to its respective bandpass filter 1310, which forwards it to the output line 1330. The signal is then forwarded to the transmit antenna 201 of the multi-sector antenna 200T which is connected to the output line 1330, and the signal is transmitted in the requisite direction with a certain beamwidth from the transmit antenna 201.

Figure 14:
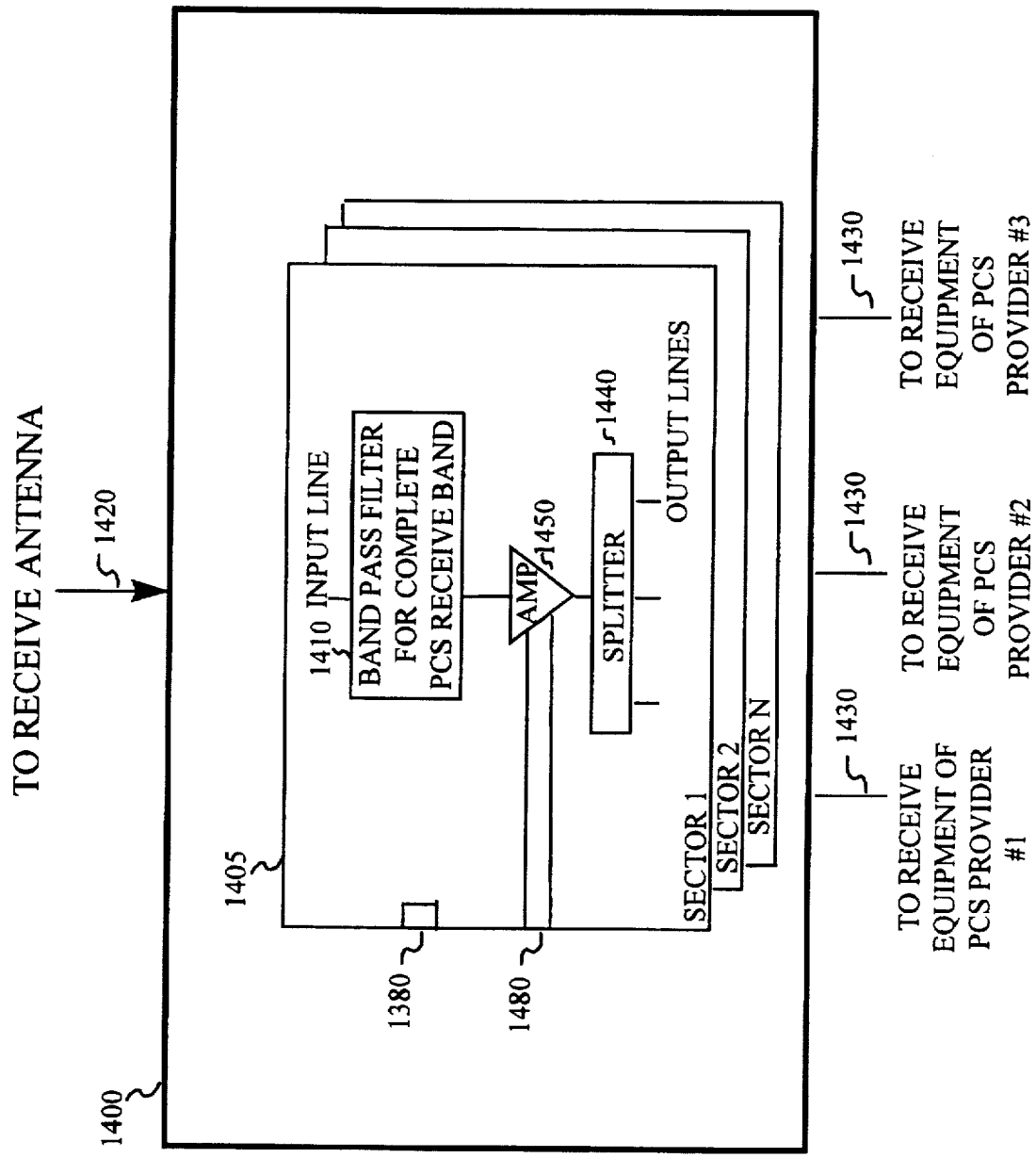
FIG. 14 depicts the receiver network of the present invention.

As shown in FIG. 14, the receiver network 1400 consists of a receiver sector 1405 for each antenna sector. Each receiver sector 1405 preferably includes: a bandpass filter 1410 for filtering all signals within the PCS receive frequency band for cell sites, including the PCS receive frequency bands shown in FIG. 4; an amplifier 1450 coupled to the bandpass filters 1410; a splitter 1440 coupled to the amplifier 1450; an input line 1420 coupled to the bandpass filters 1410, where the input line 1420 is connectable to a receive antenna 201; and a plurality of output lines 1430 coupled to the splitter 1440, where each output line is connectable to receiver equipment of a PCS Provider.

Like those of the transmitter network 1300, the bandpass filters 1410 of the receiver network 1400 are also preferably formed using cavity filter technology. Further, the bandpass filter 1410 preferably includes the same characteristics as described above for the bandpass filters 1310 of the transmitter network 1300, with the exception that the power handling capability may be reduced. As described above, FSY Microwave and Metropole can manufacture such bandpass filters 1410.

The amplifier 1450 is preferably a low noise amplifier (LNA). Further, the amplifier 1450 preferably has a gain of greater than 20 dB, less than a 0.5 dB peak-to-peak gain variation across any 15 MHz band, a noise receive figure of less than 1.0 dB, a 1.85 GHz–1.91 GHz frequency bandwidth, a one dB power compression point of greater than 15 dBm, and a group delay variation of less than 20 ns across any 15 MHz band. An amplifier 1450 having such characteristics is relatively inexpensive and, since normal operation will be well within the amplifier's linear response region, it does not produce the significant intermodulation distortion as described previously for high power amplifiers. Further, Miteq of Hauppauge, N.Y. manufacturers such an amplifier 1450 under part no. AFD3-018022-09-LN, and MMI also manufactures such an amplifier 1450.

Of particular importance, because the receiver network 1400 preferably utilizes a high gain low noise amplifier 1450, the receiver network 1400 is capable of receiving signals in both non-adjacent and adjacent frequency bands. More specifically, because the amplifier 1450 is able to compensate for any loss caused by the splitter 1440 without great expense or causing significant intermodulation distortion, all PCS Providers may share the receiver network 1400 of the present invention.

The splitter 1440 may include any number of outputs necessary based on the number of output lines 1430 in the receiver network 1400, and preferably can handle more than 1 Watt of power and provide minimal gain and phase variation. RLC of Mt. Kisco, N.Y. manufacturers such a splitter 1440, including a four way splitter 1440 under part no. D-15304, as well as Narda and Mini-Circuits who also manufacturer such splitters 1440.

Also, like the transmitter network 1300, the input line 1420 and the output lines 1430 of the receiver network 1400 preferably include connectors, such as 7/16 DIN connectors. The connector of the input line 1420 allows for easy connection to a receive antenna 201, and the connectors of the output lines allow for easy connection to the PCS Providers receiver equipment.

In use, each output line 1430 of a receiver sector 1405 is connected to the receiver equipment, including a receiver, of a PCS Provider, and the input line 1420 is connected to a single receive antenna 201 for the receiver sector 1405. As described in the Background of the Invention for FIGS. 2 and 3, each receive multi-sector antenna 200R is comprised of multiple receive antennas 201 which cover a horizontal sector (e.g., 32 degrees, 65 degrees, 90 degrees, 105 degrees, 120 degrees, etc.). Therefore, if, for example, each receive antenna 201 covers only 120 degrees, then three receive antennas 201 could be used to form a receive multi-sector antenna 200R covering 360 degrees. In this case, three sets of the receiver sector 1405 would be used where they could be packaged either separately or together.

The reception equipment for each PCS Provider is then connected to the respective output lines of each receiver sector 1405, and each receiver sector 1405 is connected to a 120 degree receive antenna 201 based on the desired direction of reception. Accordingly, each PCS Provider may receive its signals over the same receive multi-sector antenna 200R which receives signals in all directions.

In operation, the receive multi-sector antenna 200R receives a signal in a PCS Provider frequency band on one of its receive antennas 201 with a certain beamwidth in a particular direction and forwards the signal to the bandpass filters 1410 of the particular receiver sector 1405 connected to the receive antenna 201. The bandpass filter 1410 then filters the signal for all PCS receive bands and forwards it to the amplifier 1450 for amplifying. Finally, the signal is forwarded to the splitter 1440 which distributes the signal to individual PCS Provider's receiver equipment via an output line 1430.

Figure 15:
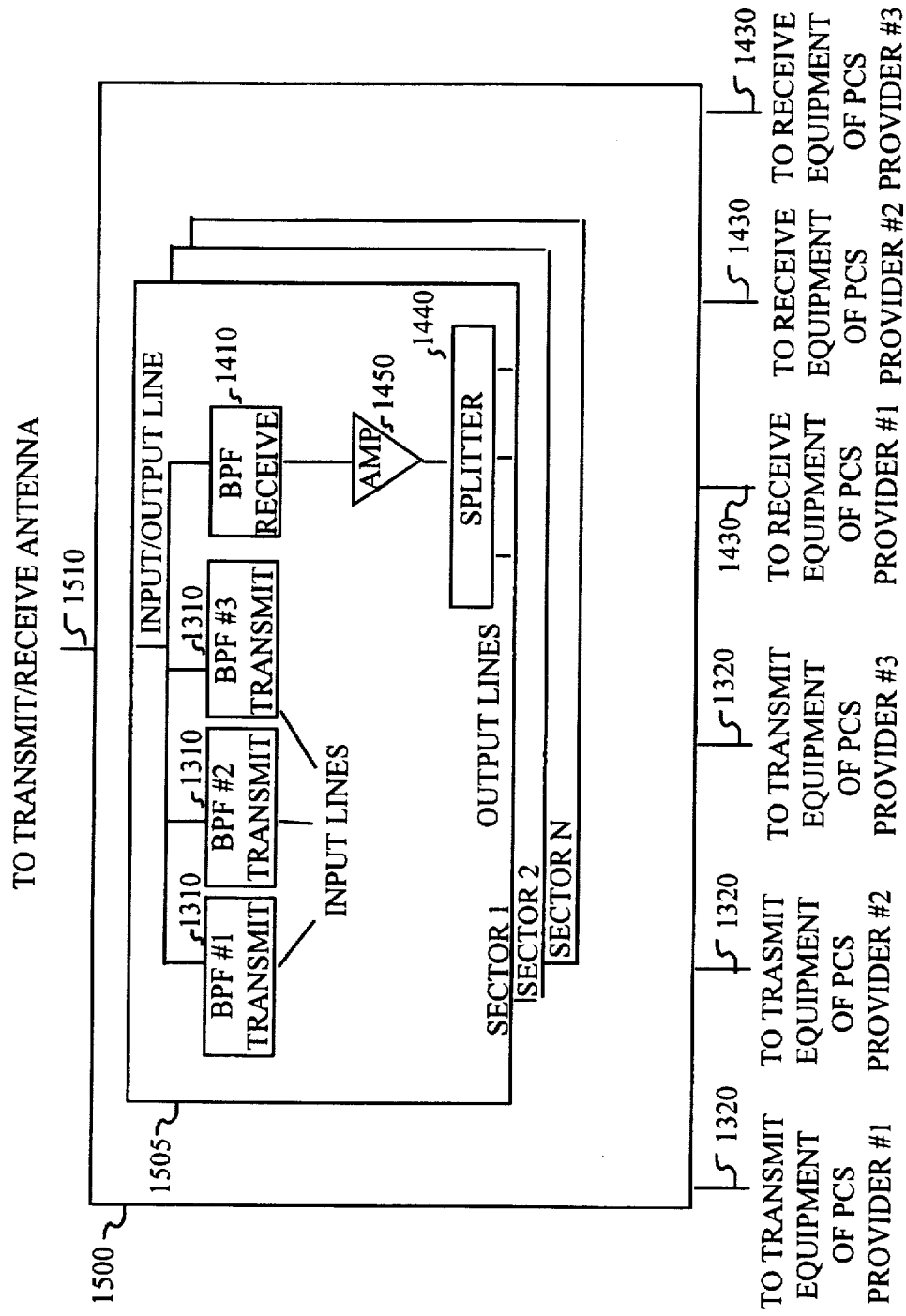
FIG. 15 depicts the transmitter/receiver network of the present invention.

As shown in FIG. 15, the transmitter network 1300 of FIG. 13 and receiver network 1400 of FIG. 14 may also be combined as a transceiver network 1500. For this embodiment, all of the components remain and operate the same, except that output lines 1330 of the transmitter network 1300 and the input lines 1420 of the receiver network 1400 are preferably replaced with input/output lines 1510, which may be connected to a transmit/receive antenna 201.

Figure 16:
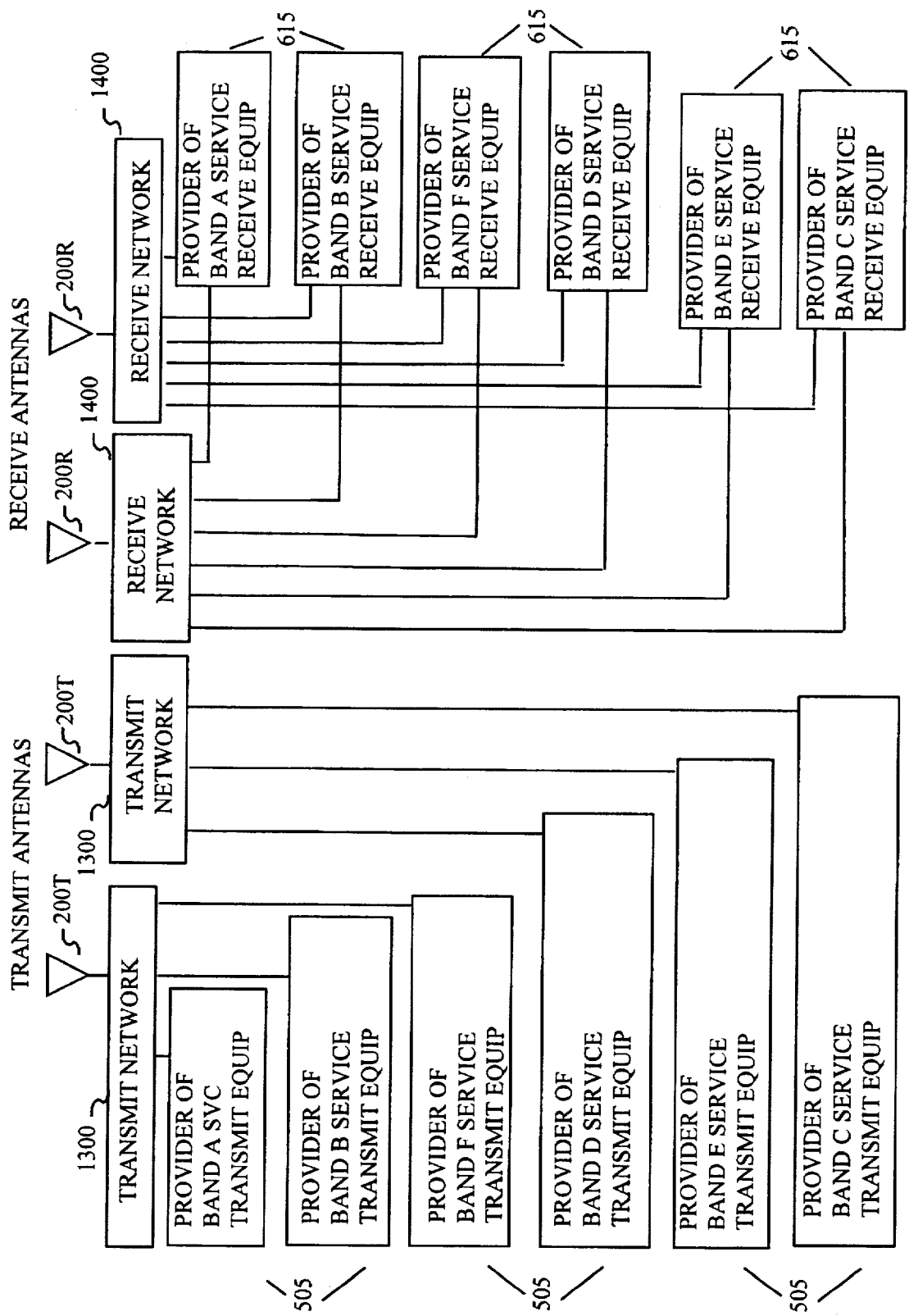
FIG. 16 depicts the implementation of the present invention with six PCS Providers sharing two transmit multi-sector antennas and two receive multi-sector antennas.

FIG. 16 illustrates an implementation of the present invention for a cell site accommodating all six PCS Providers which are to be licensed by the FCC. For this example, two transmit multi-sector antennas 200T and two receive multi-sector antennas 200R are utilized. Accordingly, PCS Providers A, B and F share one multi-sector transmit antenna 200T and both receive multi-sector antennas 200R, using one transmitter network 1300 and two receiver networks 1400 of the present invention. Further, PCS Providers D, E and C share another transmit multi-sector 200T and both receive multi-sector antennas 200R using a second transmitter network 1300 and the same two receiver networks 1400 of the present invention. For cell site situations where each PCS provider requires only a single receive input per sector, one receive multi-sector antenna 200R and one receiver network 1400 could be eliminated from this illustration.

Figure 17:
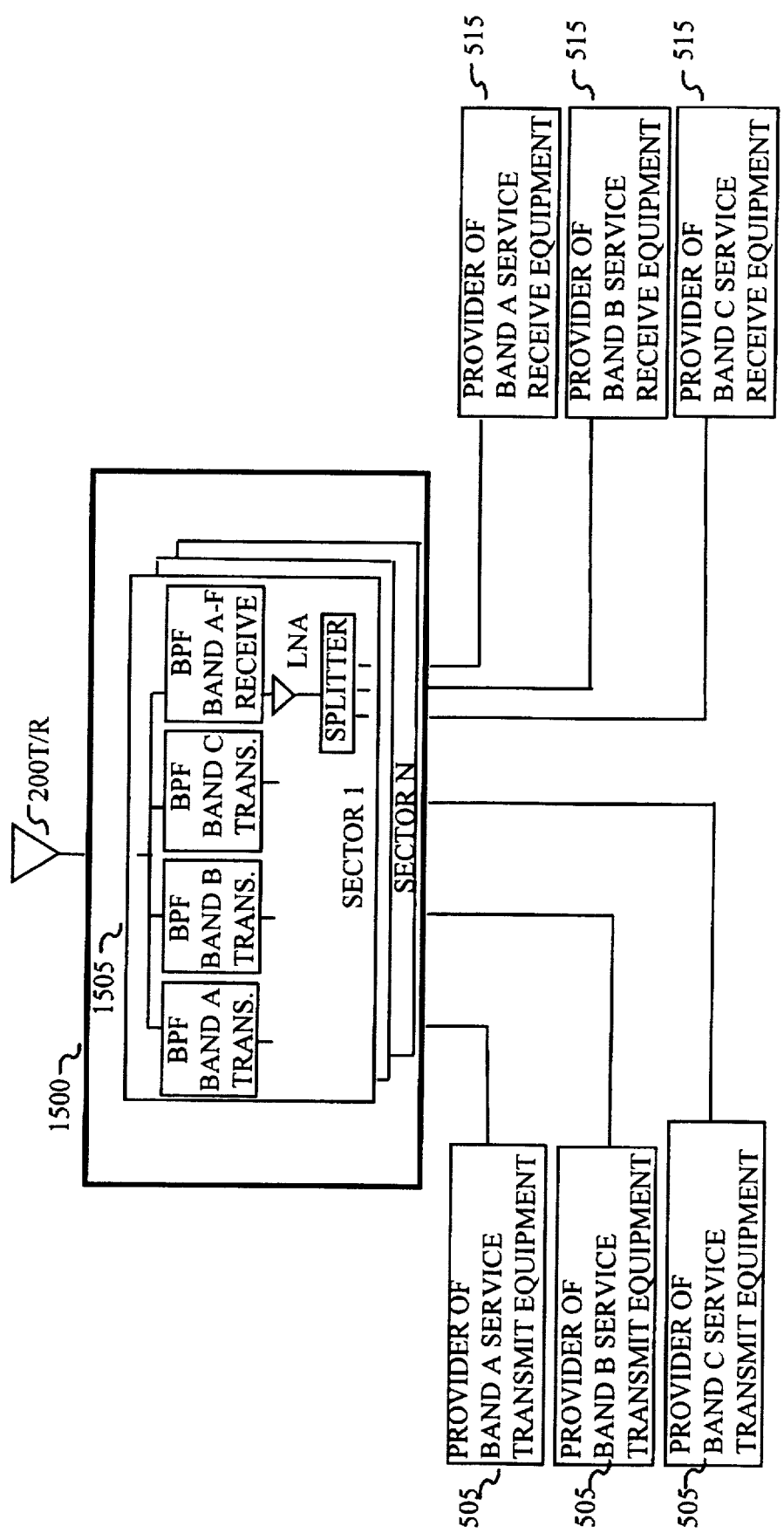
FIG. 17 depicts the implementation of the present invention with three PCS Providers sharing one transmit/receive multi-sector antenna.

In another example, FIG. 17 illustrates how PCS Providers A, B and C (three PCS Providers) may share a cell site using only one multi-sector antenna 200T/R. Here, the Providers share one transmit/receive multi-sector antenna 200T/R by using a transceiver network 1500 of the present invention.

Figure 18:
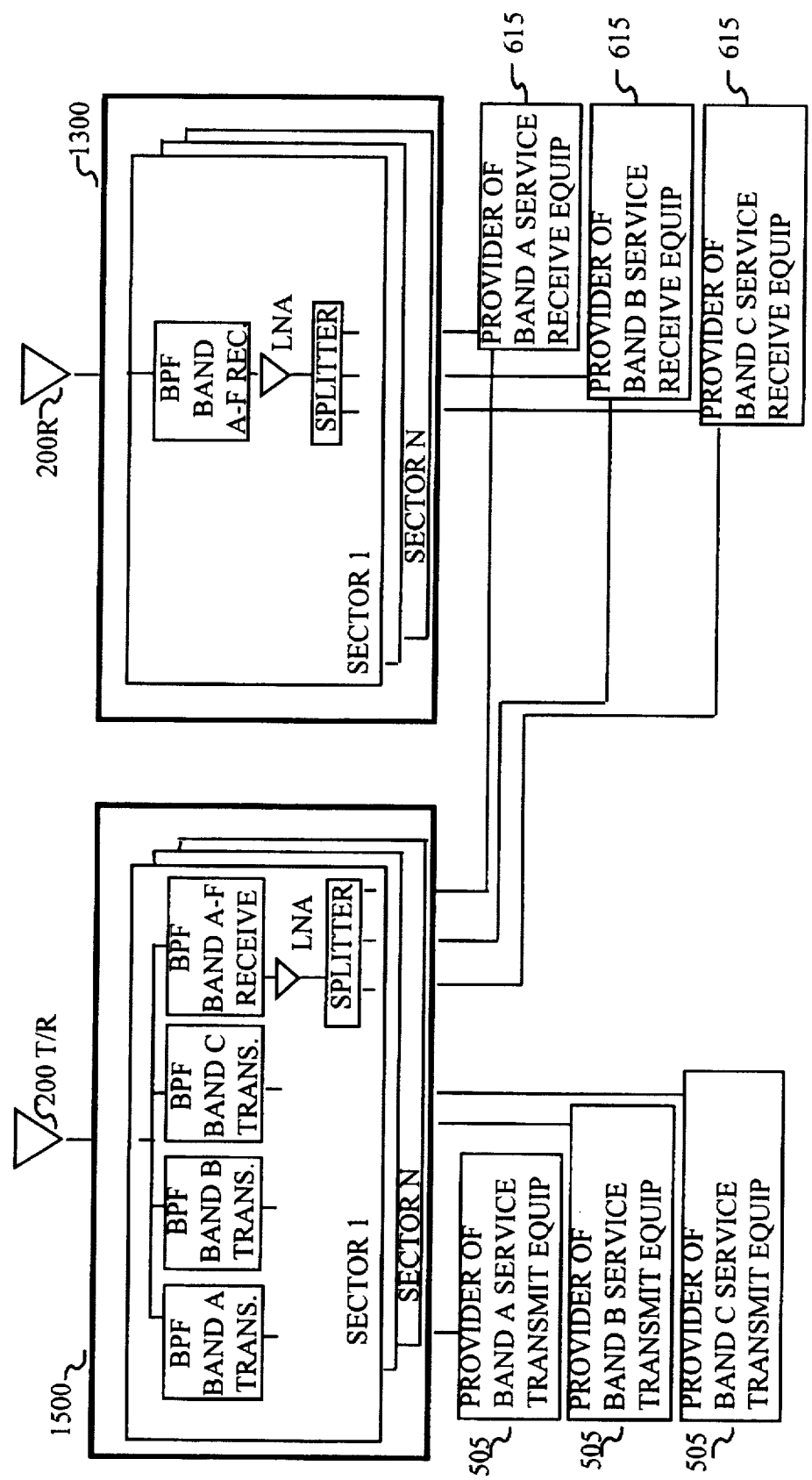
FIG. 18 depicts the implementation of the present invention with three PCS Providers sharing one receive multi-sector antenna and one transmit/receive multi-sector antenna.

In yet another example, FIG. 18 illustrates how these same three PCS Providers can use the transceiver network 1500 and the receiver network 1400 of the present invention to share one transmit/receive multi-sector antenna 200 T/R and one receive multi-sector antenna 200R.

Figure 19:
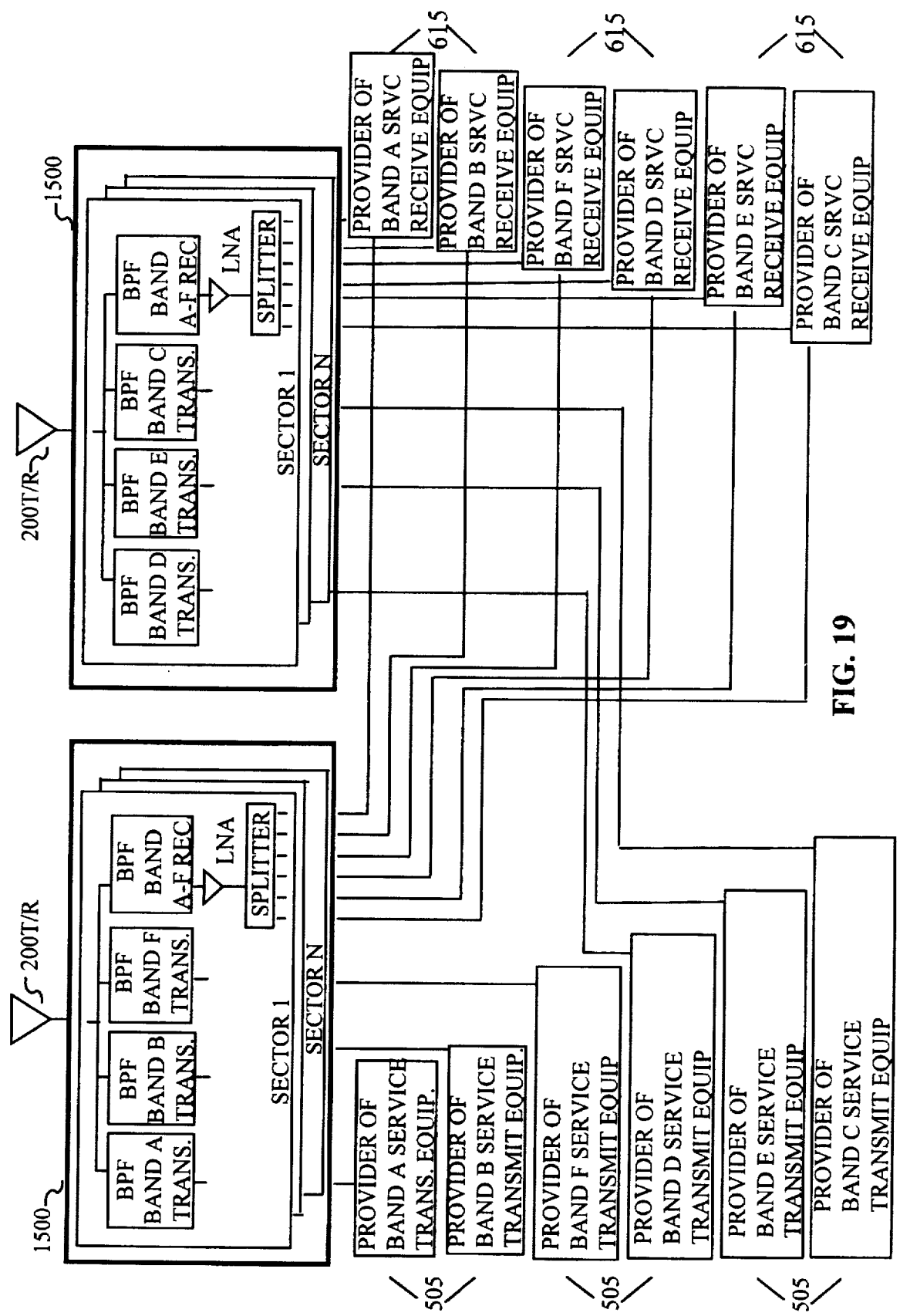
FIG. 19 depicts the implementation of the present invention with six PCS Providers sharing two transmit/receive multi-sector antennas.

In yet a further example, FIG. 19 illustrates how all six PCS Providers using the FCC licensed frequency bands may utilize the present invention to share only two transmit/ receive multi-sector antennas 200T/R using two transceiver networks 1500 of the present invention. For this example. Providers holding a license to the PCS bands A, B, and F may share one transmit/receive antenna 200T/R for their transmission path and the second transmit/receive antenna 200T/R may be used to transmit signals from the Providers holding a license to the remaining three PCS bands D, E, and C. In this example, all six Providers would have access to the receive signal for their band from two different antenna sources. It may be further seen from this example that transmissions in any three non-adjacent frequency bands may use a single transmit/receive antenna 200T/R for their transmission path and the second transmit/receive antenna 200T/R may be used to transmit signals either for these same three frequency bands, the other three non-adjacent bands, or can be used to transmit the signals from any of the six frequency bands as long as the transmit signals occupy non-adjacent PCS transmit bands.

Figure 4:
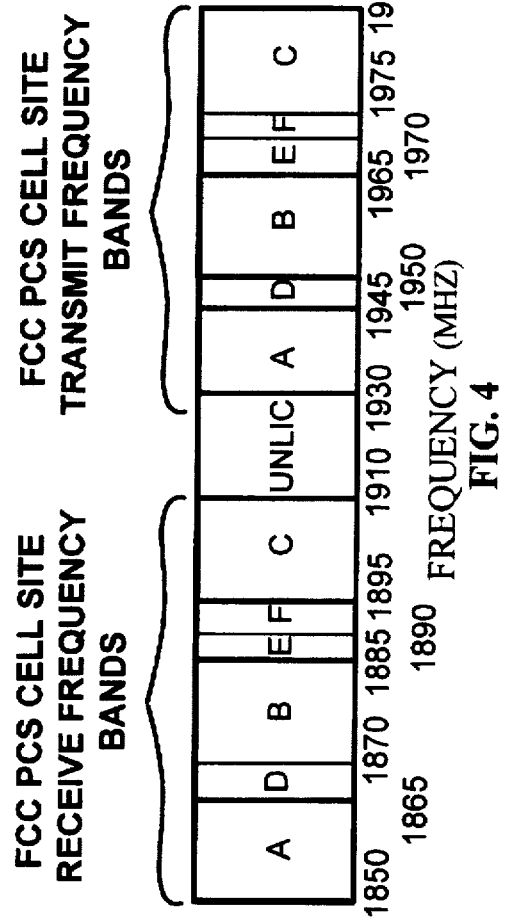
FIG. 4 depicts the frequency bands currently allocated by the FCC for use by PCS Providers in the United States.
Figure 5:
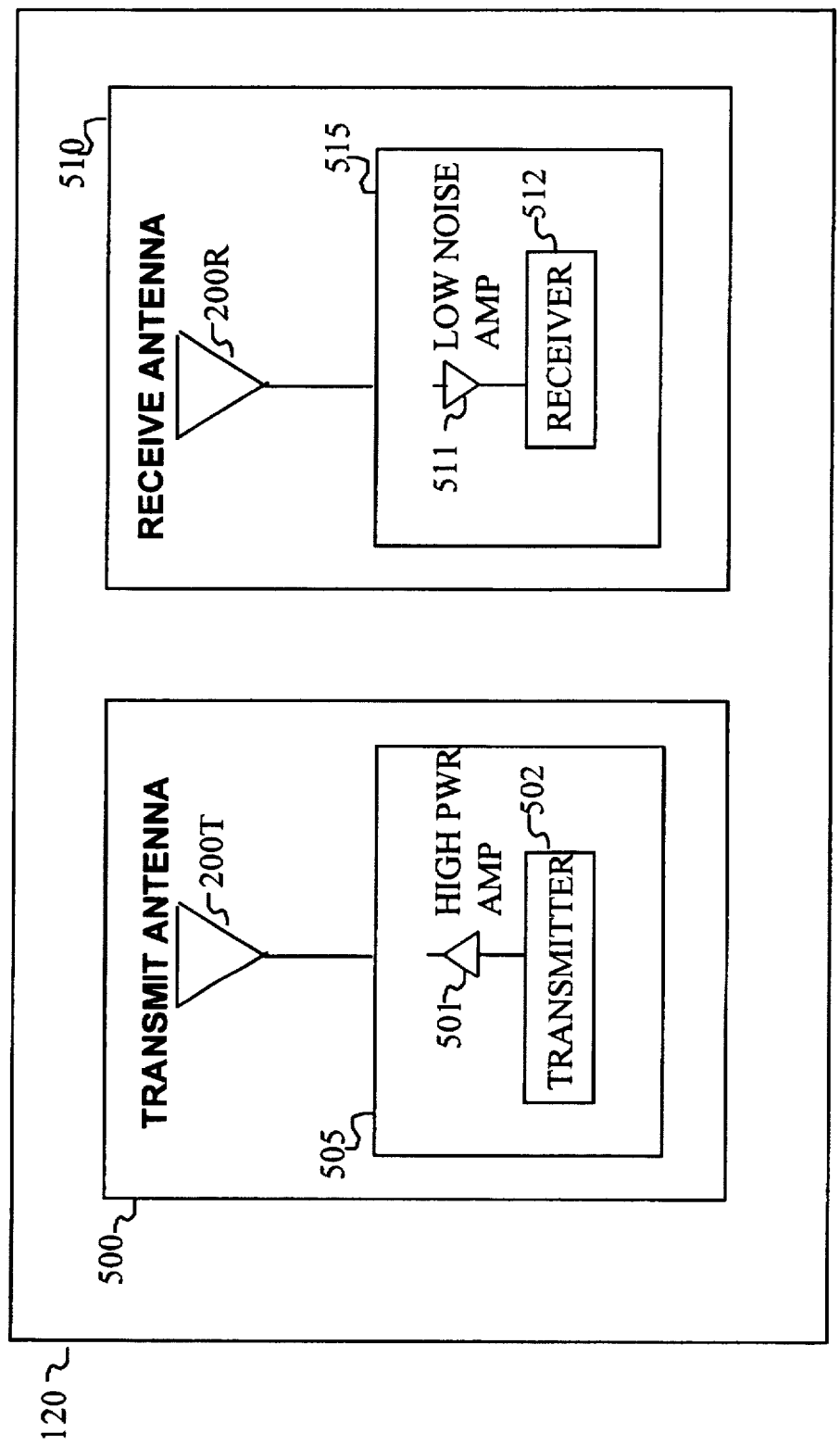
FIG. 5 depicts a diagram of a prior art multi-sector antenna system.
Figure 6A:
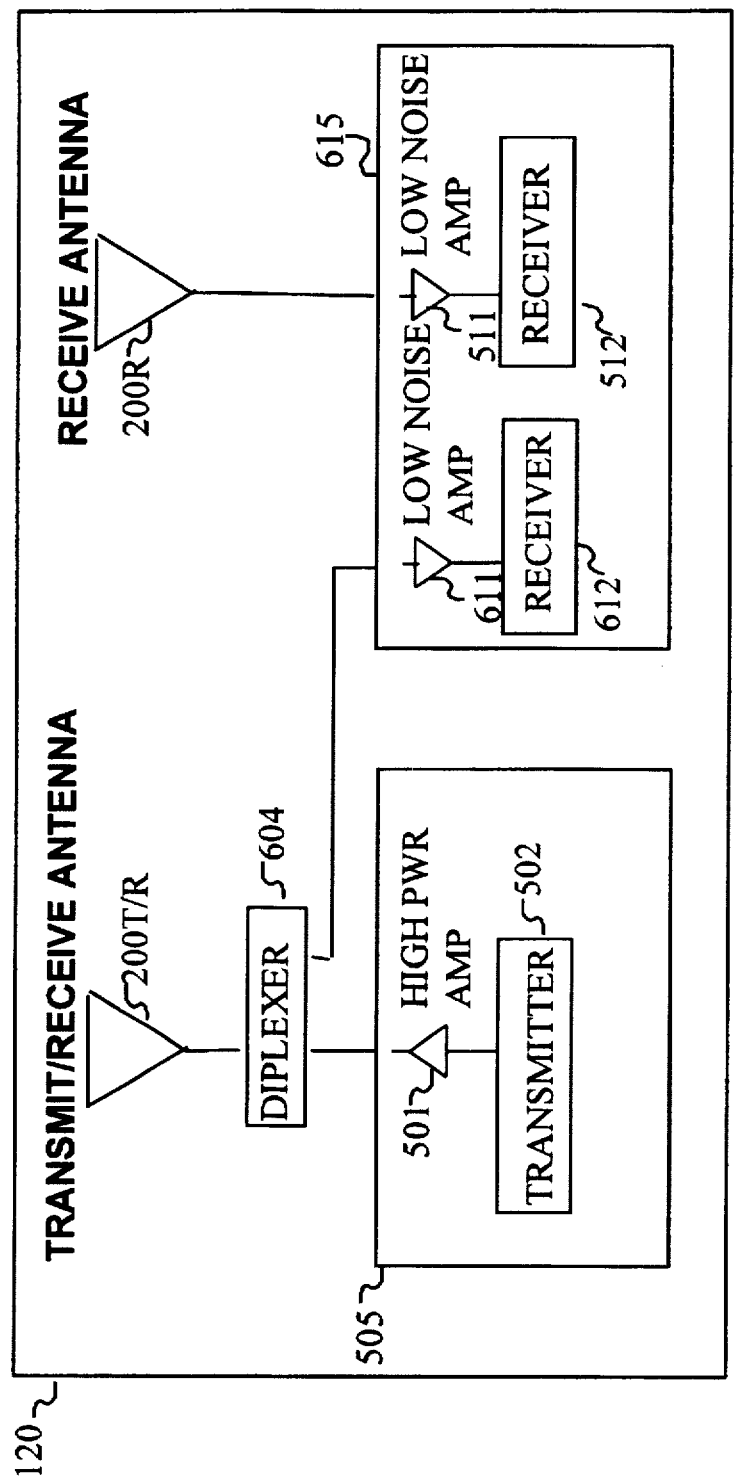
FIG. 6A depicts a diagram of another prior art multi-sector antenna system utilizing a prior art diplexer.
Figure 6B:
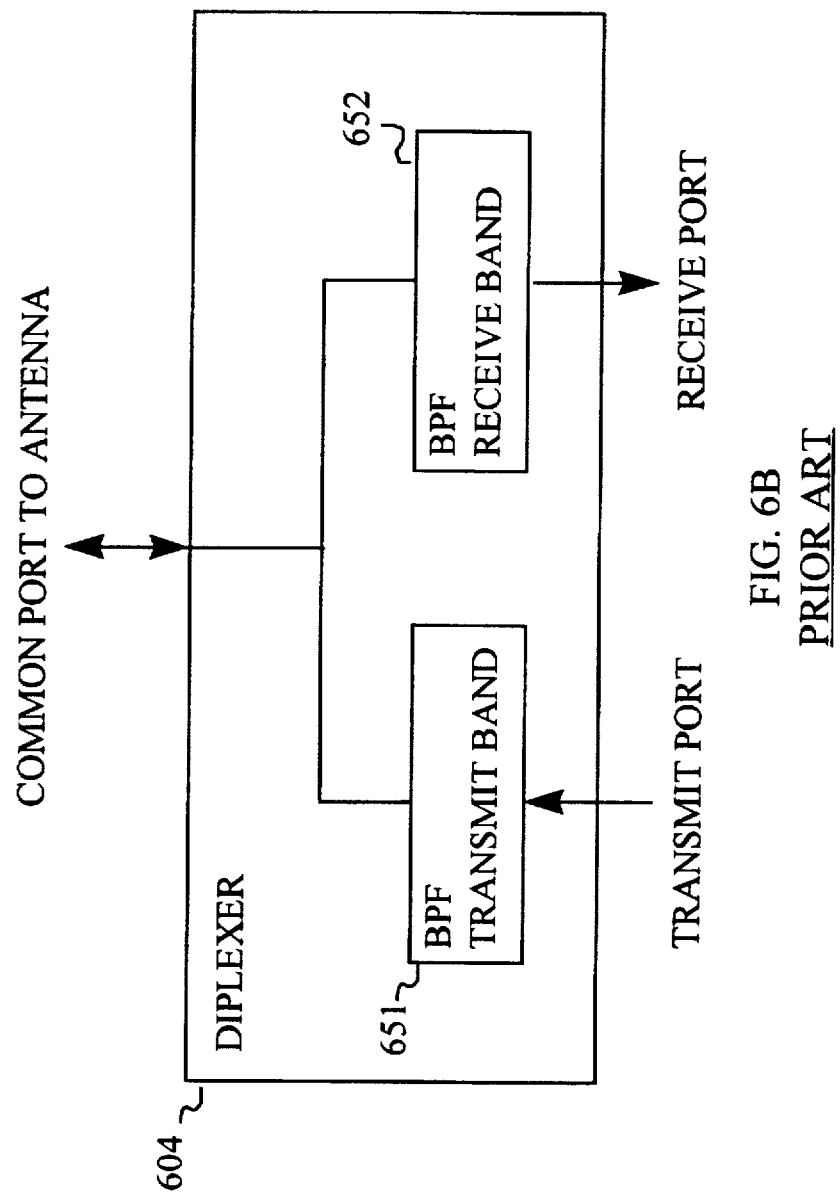
FIG. 6B depicts a prior art diplexer.
Figure 7:
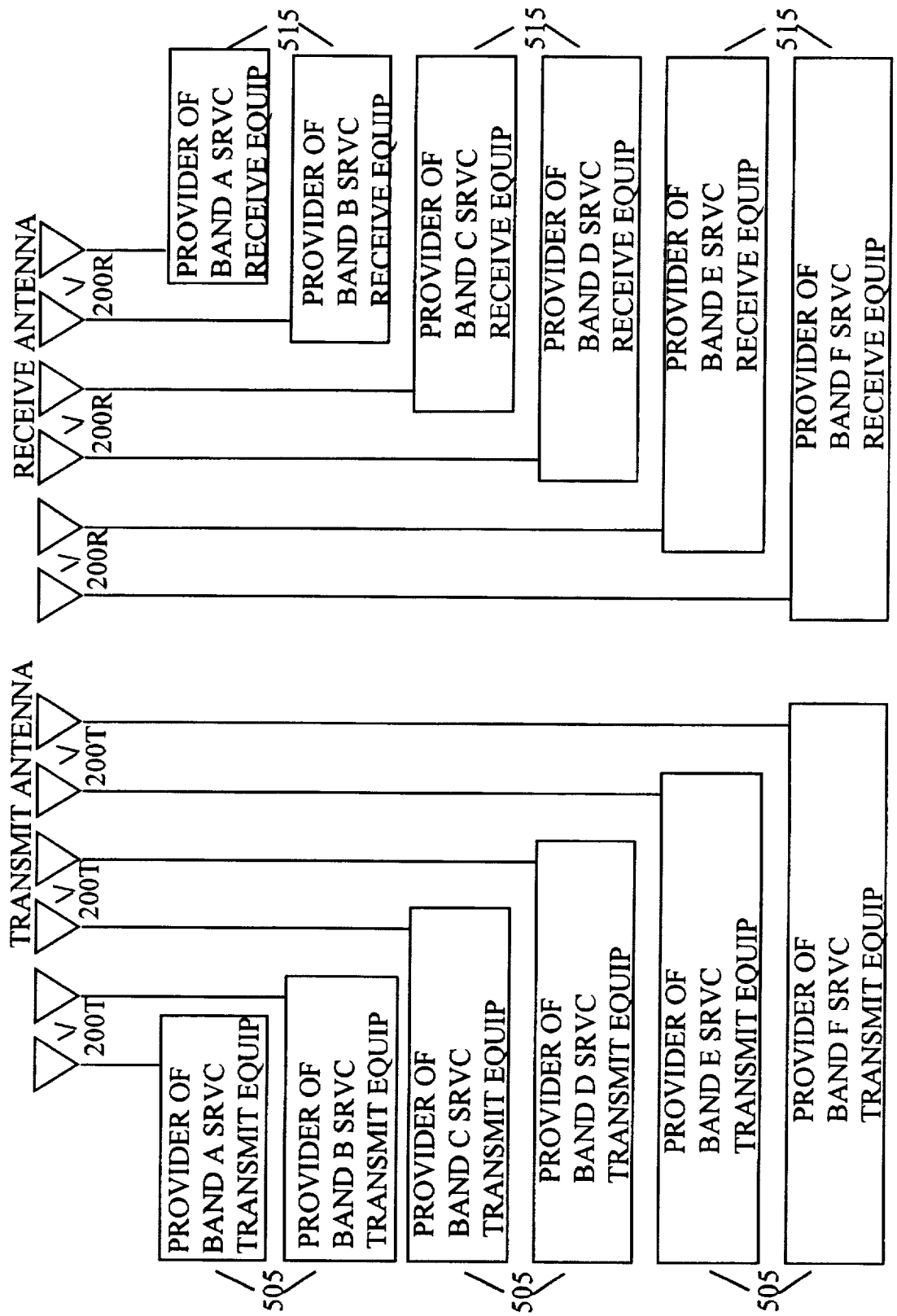
FIG. 7 depicts six PCS Providers utilizing the prior art multi-sector antenna system of FIG. 5.
Figure 8:
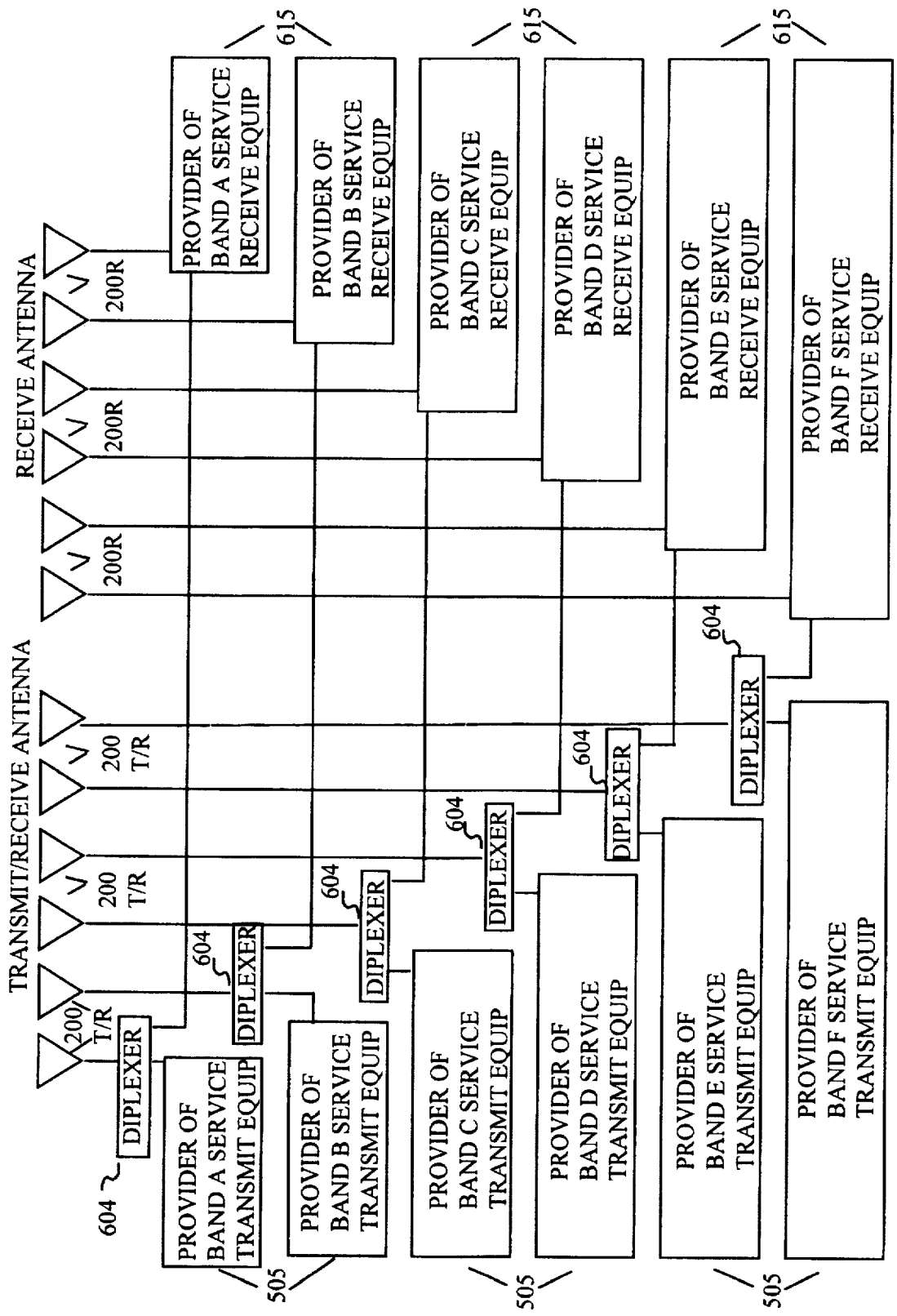
FIG. 8 depicts six PCS Providers utilizing the prior art multi-sector antenna system of FIG. 6.
Figure 9A:
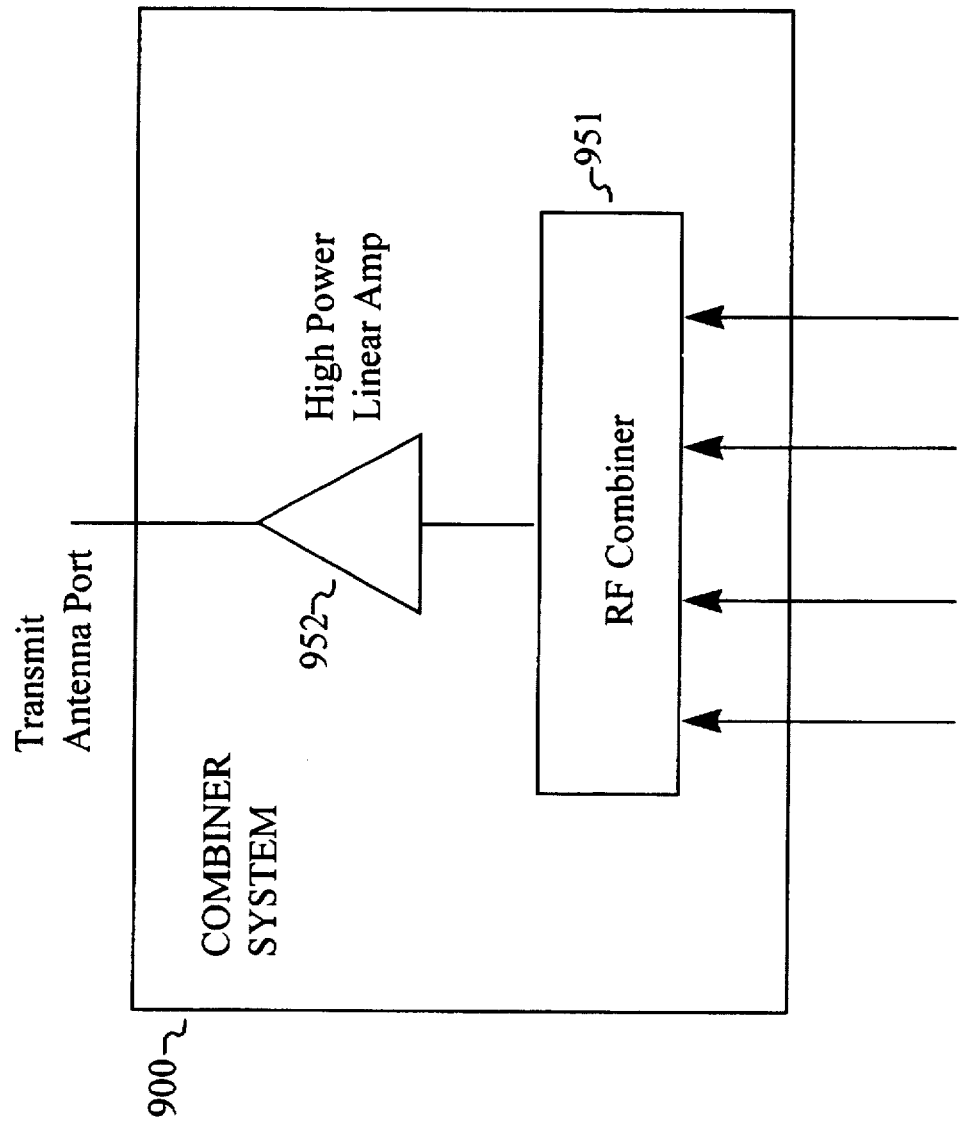
FIG. 9A depicts a prior art combiner.
Figure 9B:
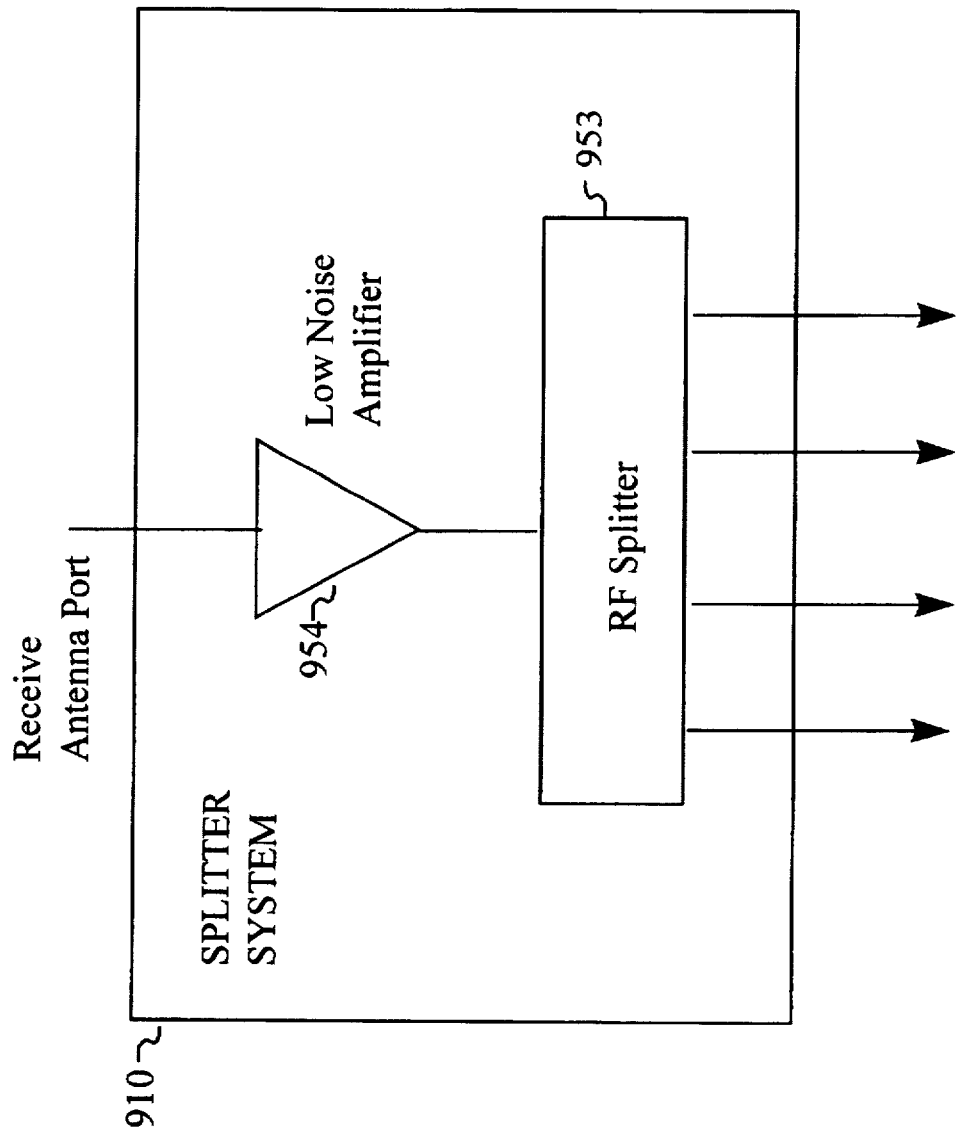
FIG. 9B depicts a prior art splitter.
Figure 10A:
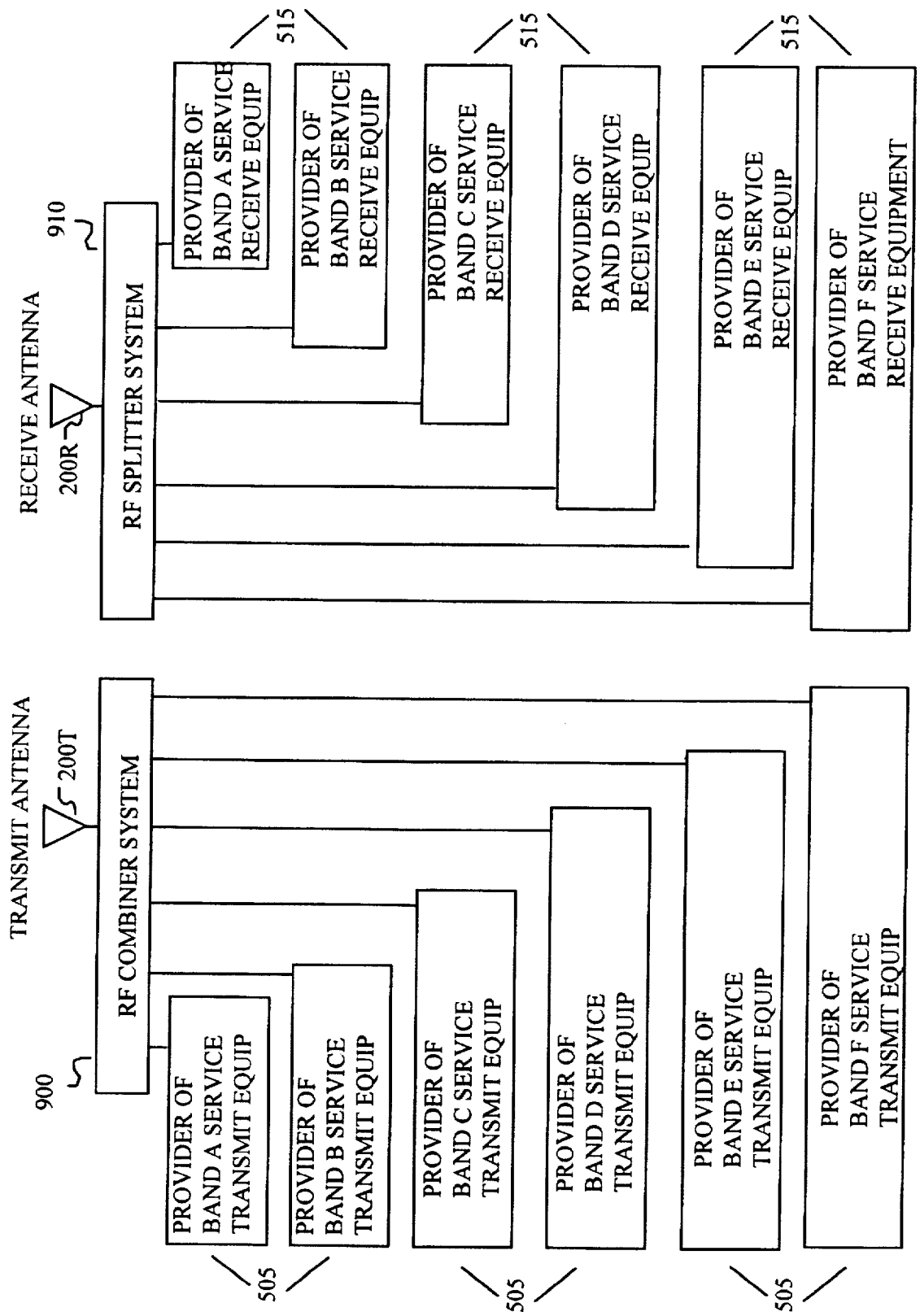
FIG. 10A depicts six PCS Providers utilizing a combiner and splitter to share the multi-sector antennas of FIG. 5.
Figure 10B:
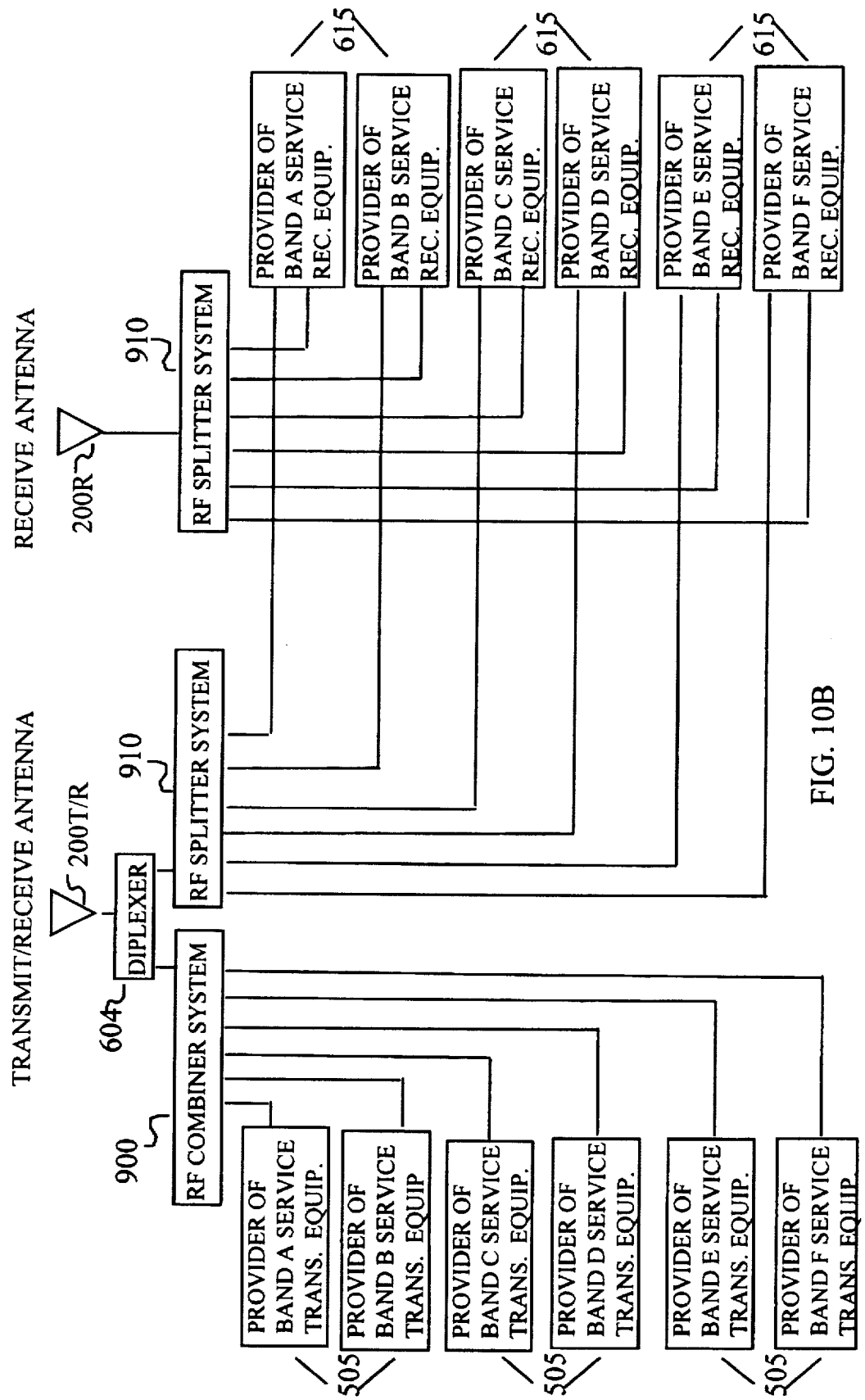
FIG. 10B depicts six PCS Providers utilizing a combiner and splitter to share the multi-sector antennas of FIG. 6.
Figure 11:
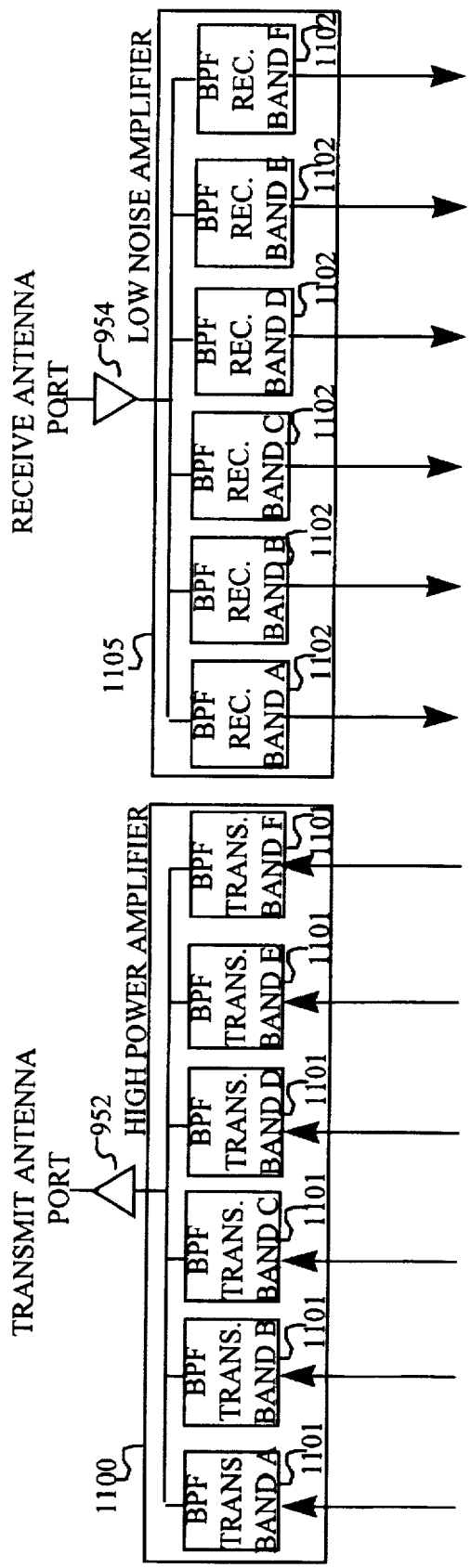
FIG. 11 depicts a prior art active multiplexer.
Figure 12:
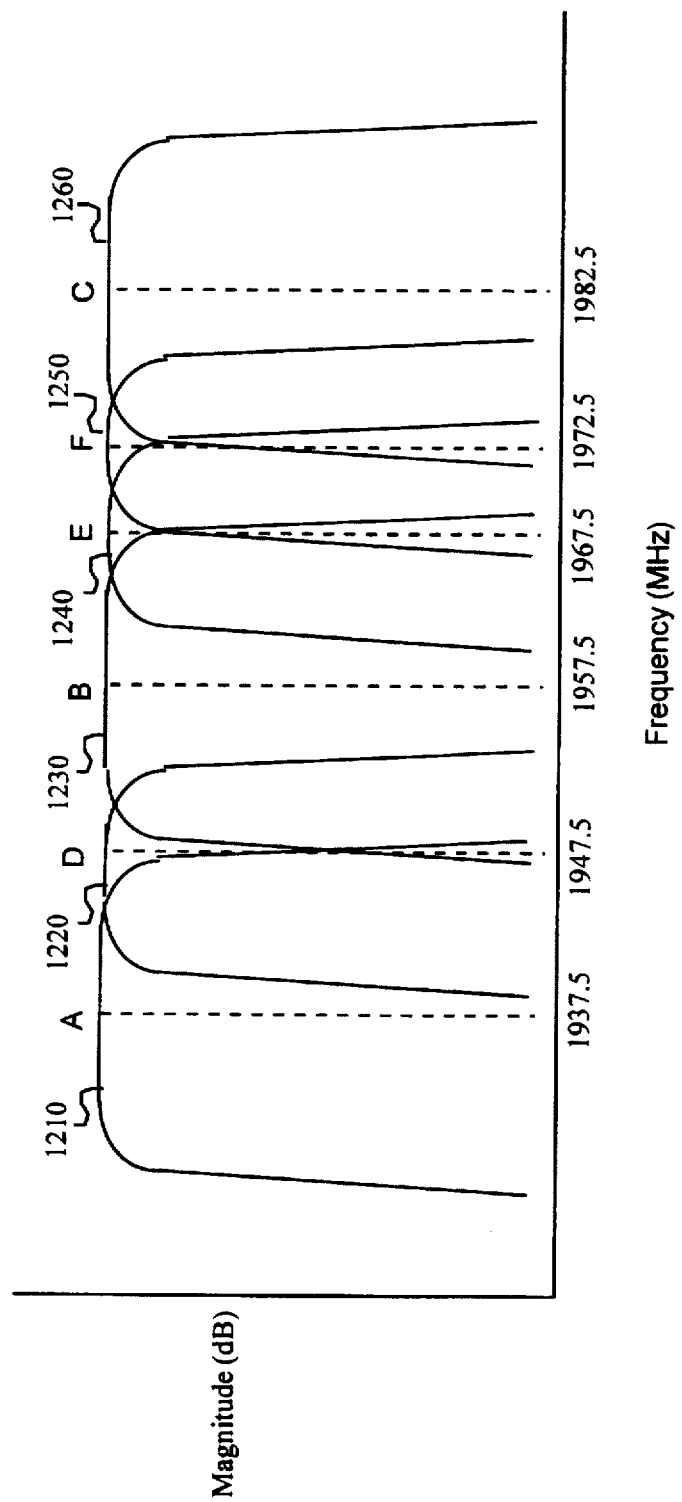
FIG. 12 depicts the filter passband response of the transmit multiplexer of FIG. 11.

Based on the above examples, it should be readily apparent to one of ordinary skill in the art that PCS Providers may share multi-sector antennas 200 in a variety of combinations as long as only transmit signals from non-adjacent PCS bands are routed to a single multisector antenna 200. Referring to FIG. 4, such combinations include: Providers A and B; Providers A and E; Providers A and F; Providers A and C; Providers A, B and F; Providers A, B and C; Providers A, E and C; Providers D and E; Providers D and F; Providers D and C; Providers D, E and C; Providers B and F; Providers B and C; and Providers E and C.

In another aspect of the present invention, the transmitter network 1300 of FIG. 13, receiver network 1400 of FIG. 14 and transceiver network 1500 of FIG. 15 may include built-in-test monitoring. For example, all networks 1300, 1400 and 1500 may include a means for overtemperature sensing 1380, and the receiver and transceiver networks 1400 and 1500 may include an amplifier failure detection means 1480. Further, the transmitter network 1300, receiver network 1400 and transceiver network 1500 may be packaged (e.g., in a metal box) in a variety of ways that allow for LEDs and remote monitoring connectors to be coupled to the different monitoring means and mounted to allow access from the outside of the package.

What has been described above are preferred embodiments of the present invention. It is, of course, not possible to describe every conceivable combination of components or methodologies for purposes of describing the present invention, but one of ordinary skill in the art will recognize that many further combinations and permutations of the present invention are possible.

I claim:

1. A transceiver system for allowing the communication of a plurality of frequency bands at a Personal Communication Services (PCS) cell site, said transceiver system comprising:
   (a) a transmitter system comprising:
      (i) a first transmitter adapted to transmit signals in a first transmit frequency band;
      (ii) a second transmitter adapted to transmit signals in a second transmit frequency band which is non-adjacent to said first transmit frequency band;
      (iii) a first transmitter network coupled to said first and second transmitters, wherein said first transmitter network is adapted to filter said first and second non-adjacent transmit frequency bands; and
      (iv) a second transmitter network coupled to said first and second transmitters, wherein said second transmitter network is adapted to filter said first and second non-adjacent transmit frequency bands;
   (b) a receiver system comprising:
      (i) a first receiver adapted to receive signals in a first receive frequency band;
      (ii) a second receiver adapted to receive signals in a second receive frequency band;
      (iii) a first receiver network coupled to said first and second receivers, wherein said receiver network is adapted to pass said first and second receive frequency bands to said first and second receivers; and
      (iv) a second receiver network coupled to said first and second receivers, wherein said second receiver network is adapted to pass said first and second receive frequency bands to said first and second receivers:
   (c) a first transmit/receive antenna coupled to said first transmitter network and said first receiver network, wherein said first transmit/receive antenna is adapted to transmit said first and second non-adjacent transmit frequency bands in a particular direction at a certain beamwidth and receive said first and second receive frequency bands from the same particular direction and beamwidth; and
   (d) a second transmit/receive antenna coupled to said second transmitter and receiver networks, wherein said second transmit/receive antenna is adapted to transmit said first and second non-adjacent transmit frequency bands and receive said first and second receive frequency bands in a direction different than that of said first transmit/receive antenna.

2. The transceiver system of claim 1, wherein said first transmitter network includes a first bandpass filter for filtering signals in said first frequency band and a second bandpass filter for filtering signals in said second frequency band.

3. The transceiver system of claim 1, wherein said first transmitter network is adapted to filter signals in said first and second non-adjacent frequency bands selected from the group consisting of: 1930–1945 MHz, 1945–1950 MHz, 1950–1965 MHz, 1965–1970 MHz, 1970–1975 MHz and 1975–1990 MHz; and wherein said first receiver network is adapted to filter signals in said first and second frequency bands selected from the group consisting of: 1850–1865 MHz, 1865–1870 MHz, 1870–1885 MHz, 1885–1890 MHz, 1890–1895 MHz and 1895–1910 MHz.

4. The transceiver system of claim 1, wherein said first antenna is adapted to transmit and receive said first and second non-adjacent frequency bands in the particular direction with a certain beamwidth selected from the group consisting of: 32 degrees, 65 degrees, 90 degrees, 105 degrees and 120 degrees.

5. A transmitter system for allowing the transmission of a plurality of frequency bands at a PCS cell site, said transmitter system comprising:
   (a) a first transmitter adapted to transmit signals in a first frequency band;
   (b) a second transmitter adapted to transmit signals in a second frequency band which is non-adjacent to said first frequency band;
   (c) a first transmitter network coupled to said first and second transmitters, wherein said first transmitter network is adapted to filter said first and second non-adjacent frequency bands;
   (d) a first transmit antenna coupled to said first transmitter network, wherein said first transmit antenna is adapted to transmit said first and second non-adjacent frequency bands in a particular direction at a certain beamwidth;
   (e) a second transmitter network coupled to said first and second transmitters, wherein said second transmitter network is adapted to filter said first and second non-adjacent frequency bands; and (f) a second transmit antenna coupled to said second transmitter network wherein said second transmit antenna is adapted to transmit said first and second non-adjacent frequency bands in a direction different than that of said first transmit antenna.

6. The transmitter system of claim 5, wherein said first transmitter network includes a first bandpass filter for filtering signals in said first frequency band and a second bandpass filter for filtering signals in said second frequency band.

7. The transmitter network of claim 5, wherein said first transmitter network is adapted to filter signals in said first and second non-adjacent frequency bands selected from the group consisting of: 1930–1945 MHz, 1945–1950 MHz, 1950–1965 MHz, 1965–1970 MHz, 1970–1975 MHz and 1975–1990 MHz.

8. The transmitter system of claim 5, wherein said first transmit antenna is adapted to transmit said first and second non-adjacent frequency bands in the particular direction with a certain beamwidth selected from the group consisting of: 32 degrees, 65 degrees, 90 degrees, 105 degrees and 120 degrees.

* * * * *

UNITED STATES PATENT AND TRADEMARK OFFICE
CERTIFICATE OF CORRECTION

PATENT NO. : 5,781,865
DATED : July 14, 1998
INVENTOR(S) : R. Keith Gammon

It is certified that error appears in the above-indentified patent and that said Letters Patent is hereby corrected as shown below:

column 4, line 40, delete "CS" and insert --PCS-- column 9, line 53, delete "D-15304" and insert --D-1530-4--

Signed and Sealed this

Twenty-sixth Day of December, 2000

Attest:

Q. TODD DICKINSON

*Attesting Officer*   *Director of Patents and Trademarks*